(12) United States Patent
Ogden

(10) Patent No.: US 7,790,032 B2
(45) Date of Patent: Sep. 7, 2010

(54) WASTE TREATMENT PROCESS

(75) Inventor: Michael H. Ogden, Santa Fe, NM (US)

(73) Assignee: Bioregen Systems LLC, Englewood, NJ (US)

(*) Notice: Subject to any disclaimer, the term of this patent is extended or adjusted under 35 U.S.C. 154(b) by 0 days.

(21) Appl. No.: 11/958,060

(22) Filed: Dec. 17, 2007

(65) Prior Publication Data
US 2008/0156725 A1 Jul. 3, 2008

Related U.S. Application Data

(62) Division of application No. 10/972,285, filed on Oct. 22, 2004, now Pat. No. 7,361,268.

(51) Int. Cl.
*C02F 3/00* (2006.01)
(52) U.S. Cl. .............. 210/602; 210/622; 210/623; 210/624; 210/626; 210/627; 210/628
(58) Field of Classification Search ......... 210/620–628, 210/602
See application file for complete search history.

(56) References Cited

U.S. PATENT DOCUMENTS

| | | | |
|---|---|---|---|
| 4,169,050 A | 9/1979 | Serfling | |
| 4,415,450 A | 11/1983 | Wolverton | |
| 4,872,985 A | 10/1989 | Dinges | |
| 5,087,353 A | 2/1992 | Todd | |
| 5,435,923 A * | 7/1995 | Girovich | ............ 210/770 |
| 5,863,433 A | 1/1999 | Behrends | |
| 6,068,773 A * | 5/2000 | Sheaffer | ............ 210/605 |
| 6,200,469 B1 | 3/2001 | Wallace | |
| 6,190,553 B1 | 9/2002 | Lee | |
| 2002/0130076 A1 | 9/2002 | Merritt | |

FOREIGN PATENT DOCUMENTS

EP 0442946 12/1993

OTHER PUBLICATIONS

\*\*Stott, R.F. "A Review: Sewage Treatment with plants," Lett. in Applied Microbiol., 1991, 12, pp. 99-105.
\*\*Hauck, R.D. "Treating Wastewater in Constructed Wetlands," J. Env. Sciences, 2002, 14, pp. 27-33.
Page 43 printout from HazTECH News, dated May 30, 2002.
Technical Support Package for "Aquatic Plants Aid Sewage Filter," NASA Tech Briefs, Spring 1984, vol. 8, No. 3, MFS-25808, George C. Marshall Space Flight Center, Alabama, pp. 1-6.
Certified Letter from Mary Heather Noble, State of New Mexico Environment Department to Leslie Barclay, dated Jul. 30, 2004.
Certified Letter from Mary Heather Noble, State of New Mexico Environment Department to Leslie Barclay, dated Jul. 11, 2002.

(Continued)

*Primary Examiner*—Chester T Barry
(74) *Attorney, Agent, or Firm*—Lando & Anastasi, LLP

(57) ABSTRACT

Waste treatment systems and methods of using them to treat septage, domestic sludge or both are disclosed. Certain examples provided herein relate to waste treatment systems that include a plurality of stages, such as, for example, a plurality of ecosystems, configured to treat domestic sludge, septage or both.

19 Claims, 33 Drawing Sheets

OTHER PUBLICATIONS

Certified Letter from Mary Heather Noble, State of New Mexico Environment Department to Leslie Barclay, dated Jul. 11, 2002.

Certified Letter from Mary Heather Noble, State of New Mexico Environment Department to Leslie Barclay, dated Jul. 8, 2002.

Certified Letter from Mary Heather Noble, State of New Mexico Environment Department to Leslie Barclay, dated Feb. 15, 2002.

State of New Mexico Environment Department Improvement Division, NMEID Policy for the Use of the Domestic Wastewater Effluent for Irrigation, Dec. 1985.

Letter from Michael Ogden, Nature Systems International, LOLC to Fred Kalesh and Mary Heather Noble, dated Mar. 12, 2002.

Certificate of Analysis from Assaigai Analytical Laboratories, Inc. to Michael Ogden dated Feb. 8, 2002.

May 15, 1974 Well Record.

Jul. 14, 1978 Well Record.

Jun. 4, 1993 Well Record.

The citations listed above with a "**" are not included herewith but may be found in the parent application (U.S. Appl. No. 10/972,285).

Written Opinion and Search Report for PCT/US05/37769 dated Mar. 21, 2007, 7 pages.

Tridech, S. et al., "Tertiary Wastewater Treatment by the Application of Vascular Aquatic Plants," Chapter 24, pp. 521-230, Treatment Techniques, 1981.

Ground Water Discharge Permit Application, State of New Mexico Environment Department p. 1-19, Jun. 11, 2004.

New Mexico Environment Department Ground Water Pollution Prevention Section Discharge Permit Summary, Jul. 8, 2002, 2 pages.

Ground Water Discharge Permit Application, State of New Mexico Environment Department, Apr. 2001, 11 pages.

Soil Survey, Santa Fe Area, New Mexico, 2001, 5 pages.

Soil Survey, Road Legend 02388, Well Report and Downloads, Nov. 1, 2001, 5 pages.

Well Report and Downloads, Nov. 1, 2001 (1 page) - Pumping Equipment, Sep. 1, 2001 (2 pages).

* cited by examiner

Table 1

| Pollutant | Ceiling Conc. Limits for All Land Applied Biosolids (mg/kg) | Pollutant Conc. Limits for EQ and PC Biosolids (mg/kg) | CPLR Limits (kg/ht) | APLR Limits (kg/ht/yr) | Average Conc. in BioRegion Solids (mg/kg) | Vermacast |
|---|---|---|---|---|---|---|
| Arsenic | 75 | 41 | 41 | 2.0 | ND | |
| Cadmium | 85 | 39 | 39 | 1.9 | 6.15 | |
| Copper | 4300 | 1500 | 1500 | 75 | 970 | |
| Lead | 840 | 300 | 300 | 15 | 73.9 | |
| Mercury | 57 | 17 | 17 | 0.85 | 0.31 | |
| Nickel | 420 | 420 | 420 | 21 | 18.8 | |
| Selenium | 100 | 36 | 36 | 5.0 | ND | |
| Zinc | 7500 | 2800 | 2800 | 140 | 1660 | |
| Applies to: | All land applied biosolids | Bulk & bagged biosolids* | Bulk Solids | Bagged biosolids* | - | - |
| From Part 503: | Table 1, Sect 503.13 | Table 3, Sect 503.13 | Table 2, Sect 503.13 | Table 4, Sect 503.13 | | |

FIG. 1A

TABLE 2   Illustrative genera of algae and diatoms

Nonmotile Green Algae
  Ankistrodesmus
  Chlorella
  Chloroccum
  Kirchneriella
  Micractinium
  Pediastrum
  Oocystis
  Scendesmus
  Schroederia
  Selenastrum
  Sphaerocystis Blue green Algae
  Anacystis
  Oscillatoria
  Phormidium
  Spirulina Motile Green Algae
  Carteria
  Chlamydomonas
  Chlorogonium
  Euglena
  Phacus Diatoms
  Cyclotella
  Diatoma
  Navicula
  Nitzschia

FIG. 1B

TABLE 3  Illustrative genera of bacteria

| | | |
|---|---|---|
| Archromobacter | Nitrococcus | Thiospirillum |
| Alcaligenes | Nitrospina | Thiovulum |
| Bacillus | Nitrosococcus | Zoogloea |
| Beggiatoa | Nitrosolobus | |
| Chlorobium | Nitrosomonas | |
| Chloropseudomonas | Nocardia | Enteric Bacteria |
| Chromatium | Pelodictyon | Citrobacter |
| Chromobacterium | Prosthecochloris | Edwardsiella |
| Clathrochloris | Pseudomonas | Enterobacter |
| Clostridium | Rhodomicrobium | Escherichia |
| Crenothrix | Rhodopseudomonas | Hafnia |
| Desulfotomaculum | Phodospirillum | Klebsiella |
| Desulfovibrio | Sphaerothilus | Proteus |
| Flavobacterium | Streptomyces | Salmonella |
| Lactobacillus | Thiobacillus | Shiegella |
| Methanobacterium | Thiobacterium | |
| Methanococcus | Thiocapsa | |
| Methanosarcina | Thiopedia | |
| Nitrobacter | Thiospira | |

Propiombacterium
Archaeoglobus
Paracoccus denitrificans
Thiobacillus denitrificans
Campylobacter,
Acetobacterium
Methanothrix, Methylmonas, Methylobacter, Methylocystis
Vibrio

FIG. 1C

TABLE 4  Illustrative genera of fungi (e.g., molds and yeasts)

| | | |
|---|---|---|
| Achlya | Arthrobotrys | Aspergillus |
| Allescheria | Botryotrichum | Curvularia |
| Aphanomyces | Botrytis | Dendryphion |
| Arthoderma | Candida | Fusarium |
| Chaetomium | Dladobotryum | Gliocladium |
| Colletotrichum | Crytococcus | Gliomastix |
| Cunninghamella | Epicoccum | Helminthosporium |
| Diplodia | Geotrichum | Isaria |
| Emericella | Humicola | Leptographium |
| Emericellopsis | Hymenula | Memnoniella |
| Endomycopsis | Kloeckera | Paecilomyces |
| Gongronella | Leptomitus | Penicillium |
| Hansenula | Monochaetia | Phialophora |
| Mucor | Monosporium | Scopulariopsis |
| Phoma | Nigrospora | Stachybotrys |
| Pichia | Pestalotia | Stemphylium |
| Rhizopus | Phodotorula | Stysanus |
| Saccharomyces | Sepedonium | Thysanophora |
| Sartorya | Sporobolomyces | Trichocladium |
| Saturnomyces | Torulopsis | Verticillium |
| Syncephalastrum | Trichosporon | |

FIG. 1D

TABLE 5    Illustrative genera of protozoa

| | |
|---|---|
| Colpoda | Arcella |
| Euplotes | Chilodonella |
| Frontonia | Cyclidium |
| Halteria | Hastatella |
| Lionotus | Opisthonecta |
| Paramecium | Oxytricha |
| Pleuronerma | Sphaerophyra |
| Stombildium | Stylonichia |
| Stylonychia | Uronema |
| Trachelius | Vorticella |

| |
|---|
| Amoeba |
| Aspidisca |
| Astylozoon |
| Colpidium |
| Didinium |
| Opercularia |
| Opercularia |
| Prorodon |
| Tachysoma |
| Urostyla |

FIG. 1E

TABLE 6    Illustrative Insects

| COLEOPTERA | DIPTERA (con't) | EPHEMEROPTERA |
|---|---|---|
| Dytiscidae | Pelopia | Baetidae |
| Laccophilus | Procladius | Caenis |
| Bidessus | Pentaneura | Cloeon |
| Thermonectes | Endochironomus | HEMIPTERA |
| Acilius | Smittia | Belostomatidae |
| Hygrotus | Chaoboridae | Belostoma |
| Hydrophilidae | Chaoborus | Nepidae |
| Berosus | | Ranatra |
| Tropisternus | | |
| Helochares | Heleidae | Corizidae |
| Helphorus | Culiocodes | Corisella |
| Hydrophilus | Palpomyia | Sigara |
| Enochrus | Tabanidae | Notonectidae |
| Gyrinidae | Tabanus | Notonecta |
| Dineutus | Chrysops | Veliidae |
| Haliplidae | Culicidae | Mesoveliidae |
| Peltodytes | Culex | Mesovelia |
| Heliplus | Culiseta | Gerridae |
| | Anopheles | Gerris |
| DIPTERA | Psychodidae | Salidae |
| Chironomidae | Telematoscopus | Saldula |
| Chironomus | Psychoda | |
| Glyptotendipes | Simuliidae | ODONATA |
| Tanypus | Simulium | Libellulidae |
| Anatopynia | Ephydridae | Plathemis |
| Micropsectra | Ephydra | Perithemis |
| Clinotanypus | Brachydeutera | Pachydiplax |
| Calosectra | Syrphidae | Coenagrionidae |
| Tendipes | Erastalis | Ischnura |
| Criotopus | Stratiomyidae | Enallagama |
| Polypedilum | Stratiomyia | Anax |
| Tanytarsus | Odotomyia | |

FIG. 1F

TABLE 7    Illustrative higher fauna

Rotifers
  *Mytilina*
  *Brachionus*
  *Filinia*
  *Cephalodella*
  *Lepadella*
  *Philodian*
  *Epiphanes*
  *Pedalia*
  *Asplancha*
  *Rotaria*
  *Keratella*
Amphipods (Scuds)
  *Hyalella*
Nematodes (Worms)
Oligochaeta (Worms)
  *Limnodrilus*
  *Tubifex*

Cladocera (Water Fleas)
  *Daphnia*
  *Moina*
  *Chydorus*
  *Bosmina*
Copepods
  *Cyclops*
  *Mesocyclops*
  *Diaptomus*
Molluscs (Snails)
  *Physa*
Ostracods (Seed Shrimps)
Acari (Water Mites)
Hirudinea (Leeches)

FIG. 1G

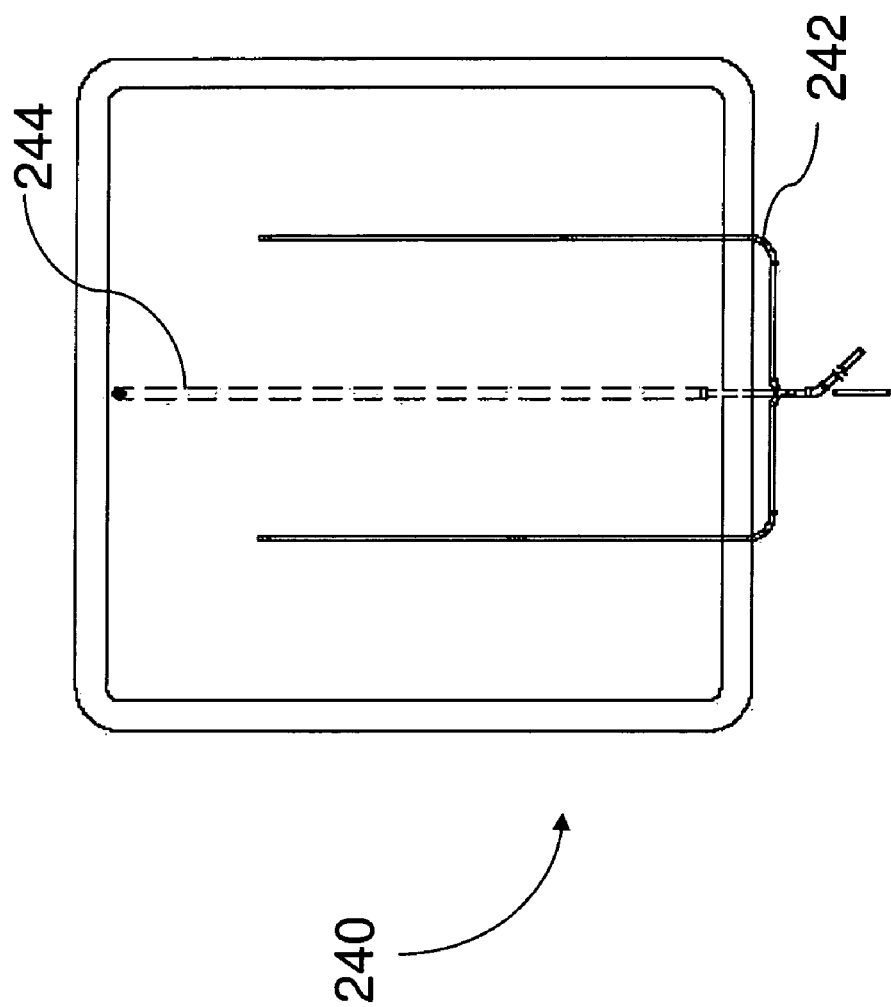

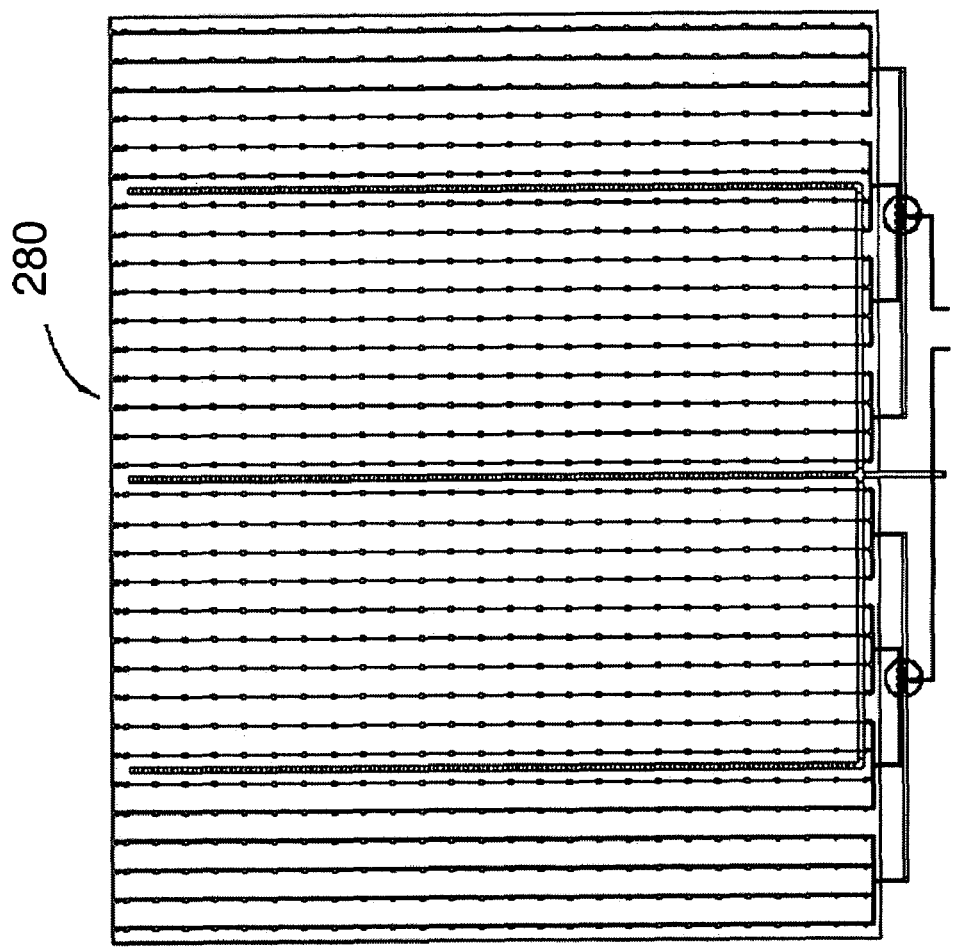

WASTE TREATMENT PROCESS

RELATED APPLICATIONS

This application is a divisional application of U.S. patent application Ser. No. 10/972,285, now U.S. Pat. No. 7,361,268, entitled "Waste Treatment Systems," filed on Oct. 22, 2004.

FIELD OF THE TECHNOLOGY

Certain examples of the present technology relate to waste treatment systems configured to treat septage, domestic sludge or both and to methods of making and using them. More particularly, certain examples of the present technology relate to domestic sludge and septage treatment systems that include a plurality of ecosystems.

BACKGROUND

Designing cost effective sludge and septage treatment systems to treat the septage and sludge generated in rural and suburban regions of the U.S. is a very challenging design problem. Treatment technologies relying on high energy mechanical systems such as sequencing bath reactors, activated sludge systems, or oxidation ditches often operate at significant costs, e.g., about $8.50 to $20.00 per 1000 gallons of septage and sludge. See, for example, U.S. Environmental Protection Agency, "Land Application of Municipal Wastewater", 1980, Table 8-6. Activated sludge systems, which are the most common type of municipal wastewater treatment facilities in use, can generate between 1 to 4 pounds of atmospheric carbon for every one pound of carbon removed. There remains a need for less energy intensive and environmentally friendly methods of treating septage and sludge.

SUMMARY

Certain aspects and examples described herein are directed to waste treatment systems and methods that are environmentally friendly and are scalable to treat septage, domestic sludge or both in widely varying community sizes ranging from subdivisions to municipalities.

In accordance with a first aspect, a waste treatment system configured with a plurality of stages to treat septage, sludge or both is disclosed. In certain examples, each stage of the waste treatment system is configured to remove or detoxify one or more components of the septage and/or sludge before passing the effluent onto another stage of the waste treatment system. The exact configuration of each stage of the waste treatment system can vary depending on the nature and identity of materials in the septage or sludge, environmental factors such as temperature, amount of sunlight, etc. It will be within the ability of the person of ordinary skill in the art, given the benefit of this disclosure, to design suitable stages for the waste treatment systems disclosed herein and exemplary configurations are discussed in more detail below.

In accordance with an additional aspect, a waste treatment system configured to treat domestic sludge and/or septage using a total external energy input of less than about 60-80 kilowatts per 100 cubic meters of domestic sludge and/or septage is provided. In certain examples, the waste treatment system is configured such that less than about 70-75 kilowatts per 100 cubic meters of domestic sludge and/or septage is used to treat the domestic sludge and/or septage. In some examples, the waste treatment system includes a plurality of stages with some stages using an external energy input and other stages operating without any external energy input for treatment of the waste. In yet other examples, each stage of the waste treatment system uses at least some external energy input for treatment of the waste.

In accordance with another aspect, a waste treatment system configured to treat domestic sludge and/or septage using a selected amount of land is disclosed. In certain examples, the waste treatment system is configured with an effective amount of land to provide the necessary or desired level of treatment. In some examples, the waste treatment system includes multiple stages with each stage selected to have at least an effective amount of land to treat the domestic septage and/or sludge. The exact amount of land can vary depending on the loading rate of the domestic septage and/or sludge and exemplary amounts of land for a selected amount of domestic sludge and/or septage are discussed in more detail below.

In accordance with an additional aspect, a waste treatment system configured with a plurality of ecosystems is provided. In certain examples, each ecosystem of the waste treatment system is selected such that the ecosystem can treat or remove one or more components in the septage or sludge using one or more biological processes occurring in the ecosystem. In some examples, the ecosystems are configured such that substantially no external energy input is required for operation of the waste treatment system. In other examples, the ecosystems are configured such that the total external energy input supplied to all ecosystems of the waste treatment system does not exceed about 60-80 kilowatts per 100 cubic meters of sludge or septage.

In accordance with yet another aspect, a process for treating domestic septage and/or sludge is disclosed. In certain examples, the process includes distributing air into the domestic septage and/or sludge at a selected or desired volume. The process further includes pumping domestic sludge and/or septage at a selected or desired rate. The process may also include filtering the domestic septage and/or sludge using a suitable flow rate, and optionally using a pump to supply fluid to a filtering stage or filtering device. The aeration and filtering steps may be accomplished in a single stage or in multiple stages, e.g., two or more stages where each stage may be aerated, filtered or both. In other examples, aeration is accomplished in certain stages and filtering is accomplished in different stages of the waste treatment process.

Examples of the waste treatment system disclosed herein represent a significant advance in the treatment of domestic sludge and/or septage. Waste treatment systems can be assembled to provide effective treatment of domestic sludge and/or septage while requiring minimal amounts of energy and minimal amounts of manpower and supervision. In addition, waste treatment systems can be constructed to reduce the amount of environmental pollutants generated from the waste treatment processes. These and other aspects, examples and advantages of the waste treatment systems provided herein are illustrated in more detail below.

BRIEF DESCRIPTION OF FIGURES

Certain illustrative examples are described below with reference to the accompanying figures in which:

FIGS. 1A-1G show Tables 1-7, respectively, in accordance with certain examples;

FIGS. 2A-2G are various schematics of a waste treatment system, or components thereof, in accordance with certain examples;

Figure 2A:
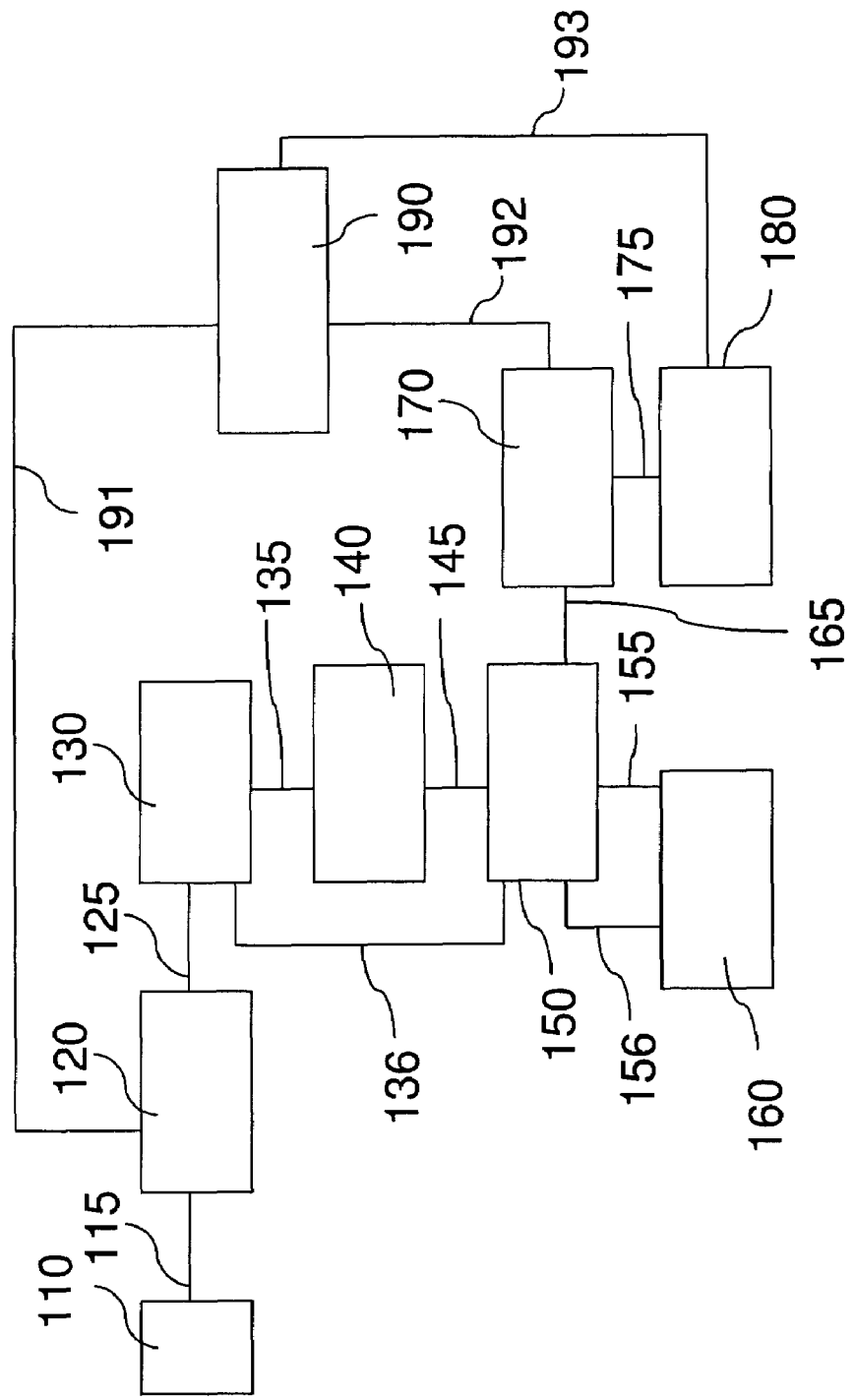
Figure 2B:
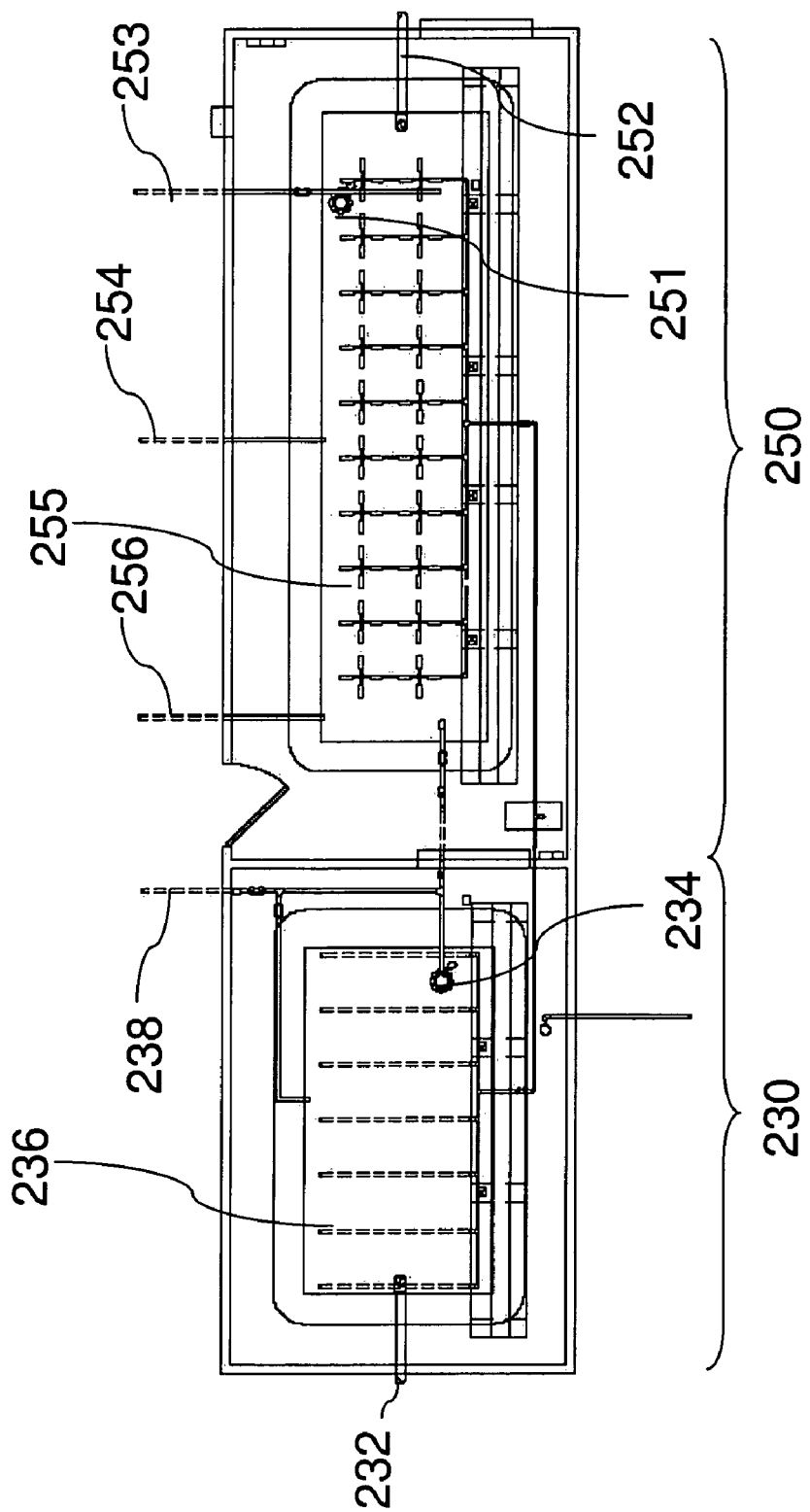
Figure 2E:
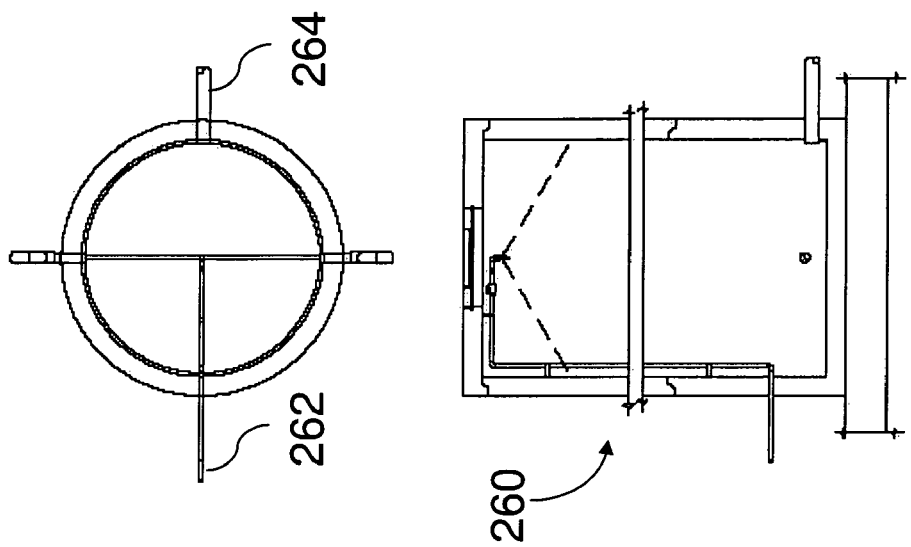
Figure 2D:
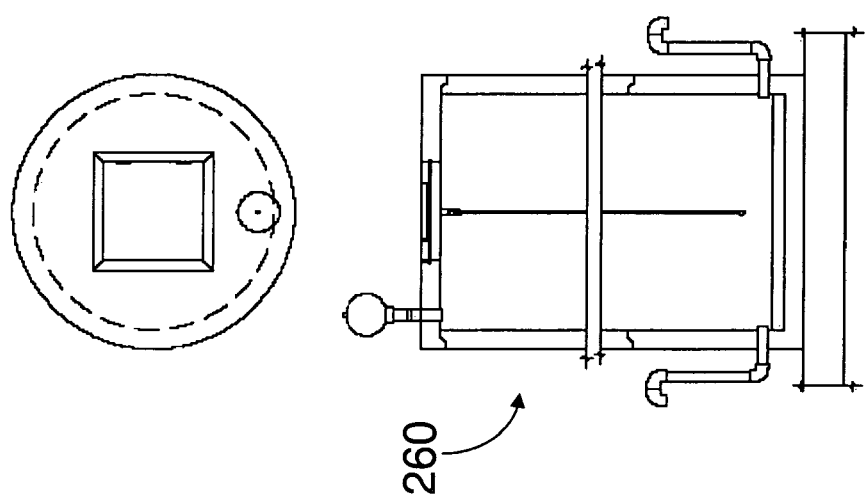
Figure 2F:
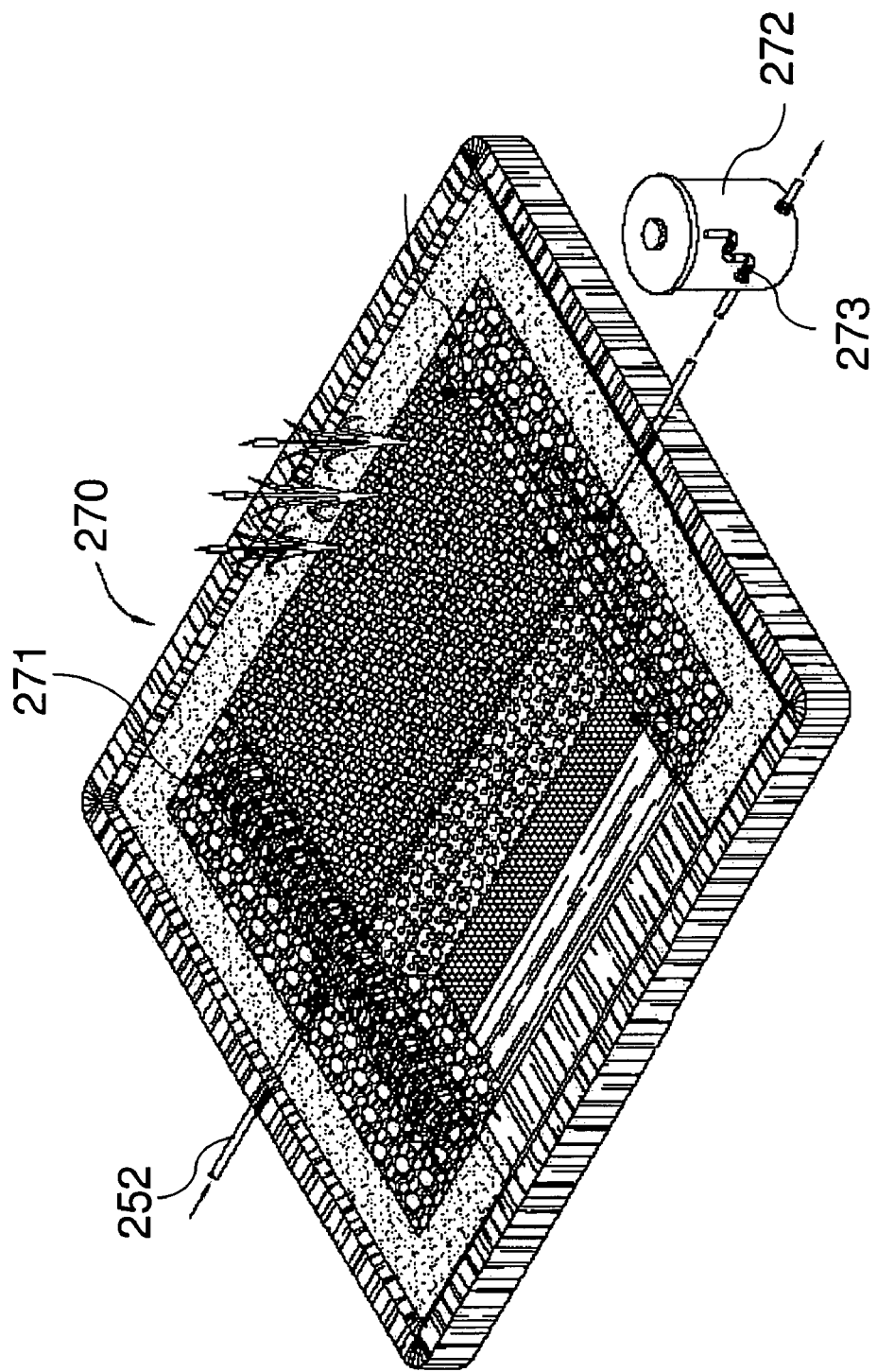

It will be recognized by the person of ordinary skill in the art, given the benefit of this disclosure, that the configurations shown in FIGS. 2A-2G and 19-22 are merely illustrative. The stages of the waste treatment systems disclosed herein can generally be in fluid communication with any one or more other stages to provide a desired or suitable amount of treatment of septage and/or domestic sludge.

DETAILED DESCRIPTION

The person of ordinary skill in the art, given the benefit of this disclosure, will recognize that the exemplary waste treatment systems discussed herein allow for reduced power requirements, reduced operating personnel, reduced carbon output, and additional results not typically achieved with existing waste treatment systems.

As used herein, the term "septage" refers to liquid or solid material pumped from a septic tank, cesspool, or similar domestic anaerobic sewage treatment system or a holding tank. As used herein, the term "fluid communication" refers to the condition where a path or route exists by which a fluid might flow, e.g., a path exists for a fluid, such as a gas or liquid, for example, to flow from a first device or structure to a second device or structure or vice versa.

As used herein, the term "effective treatment volume" refers to a sufficient volume of land or material to provide a suitable amount of treatment to the domestic sludge and/or septage. For example, where a stage of the waste treatment system is configured to remove phosphorous, the stage has an effective treatment volume such that the levels of phosphorous can be lowered to an acceptable amount, e.g., an amount equal to or lower than applicable federal and/or state regulations.

In accordance with certain examples, a waste treatment system configured to treat domestic sludge and/or septage and using a total external energy input of less than about 60-80 kilowatts per 100 cubic meters of domestic sludge and/or septage, e.g., less than about 70-75 kilowatts per 100 cubic meters of domestic sludge and/or septage, is provided. In certain examples, the waste treatment system includes a plurality of stages to treat the waste by separating and composting the solids and removing soluble inorganic and organic compounds to a concentration that will comply with applicable state and federal regulations for the land application of treated wastewater and biosolids. For example, if the waste treatment system is configured to meet the regulations in the various states, for example, New Mexico, California, Texas, Louisiana, Georgia, New Jersey or Idaho, then the levels of inorganic and organic compounds in the treated wastewater should not exceed those levels detailed in statutes and regulations of those states e.g., New Mexico Statutory Authority 74-6 and associated Water Quality Commission regulations, California Title 22, Texas Natural Resource Commission Chapter 285, Louisiana Title 33 and comparable statutes and regulations in other states. It will be recognized by the person of ordinary skill in the art, given the benefit of this disclosure, that the maximum levels of solids, inorganic compounds, organic compounds, etc. in the treated wastewater can vary depending on the location of the treatment site, the end application of the treated wastewater, and the like. It will be within the ability of the person of ordinary skill in the art, given the benefit of this disclosure, to design suitable waste treatment systems that use less than about 60-80 kilowatts per 100 cubic meters of domestic sludge and/or septage and that can provide treated wastewater having less than a desired or required amount of inorganic solids, organic solids and/or other species.

In accordance with certain examples, a waste treatment system configured to treat domestic sludge and/or septage using a total external energy input of less than about 60-80 kilowatts per 100 cubic meters of domestic sludge and/or septage includes a first stage. In certain examples, the first stage may be configured to deliver domestic sludge and/or septage at a selected rate to a second stage. The delivery rate can vary depending on the exact configuration of the second stage, and in certain examples, the delivery rate is about 20-200 L per min per 100 cubic meters of septage or sludge delivered per day, more particularly about 50-150 L per min per 100 cubic meters of septage or sludge delivered per day, e.g., about 75-125 L per min per 100 cubic meters of septage or sludge delivered per day. Without wishing to be bound by any particular scientific theory or this example, the first stage may be adapted to separate and oxidize soluble gases in the domestic septage and/or sludge. In certain examples, the first stage separates and oxidizes soluble gases, at least in part, by aerating the domestic sludge and/or septage. Any suitable aeration device or system may be used to aerate the domestic sludge and/or septage, and, in certain examples, a coarse bubble aeration system is used. For example, a coarse bubble aeration system that is configured to provide about 4 to 8 cubic meters of air per 100 cubic meters of volume may be used to aerate the domestic sludge and/or septage. In examples where a coarse aeration bubble system is used, a total external energy input of about 6 to 8 kilowatts per day of electricity per 100 cubic meters of domestic sludge and/or septage may be used. Other examples of suitable aeration systems include, but are not limited to, floating aerators of a turbine type which inject and mix the liquid, air lift pumps, coarse bubble diffusers consisting of polyvinyl plastic films enclosing an air diffusion device, glass bonded silica air stones, fused alumina, porous polyethylene hose, porous polyethylene diffusers, or HDPE piping with micro-slits and the like. In some examples, notwithstanding the type of aeration system used, the total external energy input does not exceed about 10 kilowatts per day of electricity per 100 cubic meters of domestic sludge and/or septage introduced into the first stage.

In certain examples, the first stage may include an equalization vessel, e.g., a tank, drum, reservoir, etc., that is configured with temperature control, e.g., by surrounding or partially surrounding the equalization vessel with a greenhouse or comparable structure to impart a substantially constant and/or selectable temperature to the equalization vessel. Without wishing to be bound by any particular scientific theory or this example, the equalization vessel may be configured to aerate intermittently and to mix the septage and/or sludge in the equalization vessel. Such aeration and mixing may be accomplished using numerous methods and devices including, but not limited to, air pumps, liquid pumps, mechanical mixers, agitation and the like. Such aeration and mixing may also be continuous or discontinuous, may be automated using timers, switches and the like, and the aeration and mixing may be synchronized with delivery of fluid to another stage such that, for example, any organic solids may be transferred from the equalization vessel to another stage. Again without wishing to be bound by any particular scientific theory or this example, aeration and mixing in the equalization vessel are designed to remove any volatile organic compounds, mix and suspend organic solids and to oxidize and/or cause sulfide gases, such as hydrogen sulfide, to be outgassed. In addition, the anaerobic environment of the equalization vessel can serve as a location for denitrification. In certain examples, the rate of aeration is about 0.8 to 1.1 HP per 100 cubic meters of septage and/or sludge, e.g., about 0.9 HP per 100 cubic meters of septage and/or sludge, and the total aeration time is about 5-9 hours per day, e.g., about 6-8 hours per day. Additional suitable aeration rates and times will be readily selected by the person of ordinary skill in the art, given the benefit of this disclosure.

In accordance with certain examples, the first stage may also include a suitable amount and type of organisms to provide an ecology representative of the microbial ecology at the bottom of eutrophic lakes and ponds. In some examples, the microbial ecology at the bottom of eutrophic lakes and ponds is selected for its ability to metabolize organic compounds, and in particular, organic compounds of a recalcitrant type. Aeration can be provided to the microbes using, for example, the exemplary aeration devices and methods discussed herein. Without wishing to be bound by any particular scientific theory or this example, periodic aeration may assist the development of a more diverse microbial environment that includes, for example, both anaerobic and aerobic organisms. Although the first stage is predominately anaerobic, there may be aerobic micro-sites that may begin to develop bacterial communities that are recycled from subsequent stages in fluid communication with the first stage. In certain examples, the fluid levels in the first stage are selected such that a fill and drain cycle which takes place, for example, over one to three days, more particularly about two days, is used. Without wishing to be bound by any particular scientific theory or this example, any suitable period that allows for expelling and/or oxidation of gaseous products or anaerobic microbial activity may be used in the fill and drain cycle. In certain examples, illustrative microbial ecology includes, for example, bacteria genera, see, for example, Table 3 (FIG. 1C), fungi, see, for example, Table 4 (FIG. 1D), protozoa, see, for example, Table 5 (FIG. 1E), insects see, for example, Table 6 (FIG. 1F), higher fauna, see, for example, Table 7 (FIG. 1G) and organisms capable of performing similar biological processes as those organisms listed in Tables 3-7. Additional suitable microbes and organisms for use in the first stage will be readily selected by the person of ordinary skill in the art, given the benefit of this disclosure.

In accordance with certain examples, a waste treatment system configured to treat domestic sludge and/or septage using a total external energy input of less than about 60-80 kilowatts per 100 cubic meters of domestic sludge and/or septage also includes a second stage in fluid communication with the first stage. In certain examples, the second stage may be configured to separate solids from liquid sludge and/or septage. In other examples, the second stage may be configured to stabilize biosolids such that the biosolids meet Federal 503 part (a) (40 C.F.R. §503) regulations for the land application of biosolids. In yet other examples, the second stage may be configured to mineralize nitrogen compounds. In additional examples, the second stage may be configured to reduce the total volume of sludge and/or septage by at least about 90-95%. In yet additional examples, the second stage may be configured for operation without any external energy input.

In accordance with certain examples, the second stage of the waste treatment system may include a suitable amount and type of organisms to provide an ecology representative of plants found in deltas of river systems. For example, one or more species of *Phragmites* (e.g., *Phragmites communis, Phragmites australis*), *Arundo* (e.g., *Arundo donax*), *Papyri* (e.g., *Papyri aegypti*), and/or *Scirpus* (e.g., *Scirpus acutus, Scirpus californicus, Scirpus validus*) plants may be included in the second stage. In certain examples, one or more microbial and invertebrate communities that are commonly associated with delta plants may also be included in the second stage. For example, exemplary microbial and invertebrate communities include, but are not limited to those discussed in Tables 3 and 4, *Methanosarcina* and the following invertebrates: Rotifera, Nematomorpha, Nematoda, Platyhelminthes, Annelida, *Physa*, (various snails), *Daphnia, Hyalella,* Bryozoa, Oligochaeta, Chironomidae, and Lumbricidae spp. (earthworms). Without wishing to be bound by any particular scientific theory or this example, the second stage may be configured to separate organic solids from the fluid to provide dewatering and subsequent composting of the solids. Again without wishing to be bound by any particular scientific theory or this example, microbial and invertebrate activity in the second stage can reduce the volume of the sludge and/or septage by more than about 90% and can mineralize nitrogen in the sludge and/or septage. In certain examples, solids may continue to accumulate in the second stage to a depth of about 0.5-1.5 meters, e.g., about 1.0 meter, over the course of 7-10 years. In some examples, the second stage provides solids that meet the US EPA requirements for land application of Class A biosolids (see Table 1 (FIG. 1A)). In certain examples, the effluent from this second stage has at least about 95% of the solids removed, over about 99% of the carbonaceous biochemical oxygen demand (CBOD) removed, about 90% of the nitrogen removed, and about 95-99% or more of the metals removed, including, for example, cadmium, zinc, copper, lead and nickel. The person of ordinary skill in the art, given the benefit of this disclosure, will be able to select suitable delta plants and microbial and invertebrate communities.

In accordance with certain examples, a waste treatment system configured to treat domestic sludge and/or septage using a total external energy input of less than about 60-80 kilowatts per 100 cubic meters of domestic sludge and/or septage also includes a third stage in fluid communication with the second stage. In certain examples, the third stage includes one or more aquatic systems having suitable organisms that are capable of biologically oxidizing soluble carbon and nitrogen compounds in the effluent from the second stage. In some examples, the organisms are assisted by supplying about 30 to 50 kg of oxygen per 100 cubic meters of septage and/or sludge to the fluid in the third stage. The exact methods and devices used to provide the oxygen may vary, and in certain examples, an aeration system, e.g., a fine bubble diffusion system, may be used to deliver oxygen to the third stage. For example, a fine bubble diffusion system supplied with air from a compressor or other suitable device capable of forcing ambient air (e.g., about 21% oxygen) or pure oxygen through the diffusion device, such that oxygen is dissolved in the fluid and thereby becomes available for metabolic activity of aerobic microorganism or for the chemical oxidation of certain metals and organic compounds, may be used. In some examples, the total energy requirement of the third stage is less than about 12 to 28 kilowatts per day per 100 cubic meters of fluid introduced into the third stage.

In accordance with certain examples, the third stage may include a suitable amount and type of organisms to provide an ecology representative of the ecology of subtropical and tropical ponds. Illustrative plants include, but are not limited to, water hyacinths (*Eichornia crassipes*) and associated floating and submergent pond plants, algae, attached growth microorganisms, macro and micro invertebrates, fish (e.g., *Gambusia affinis*), and amphibians. Additional organisms are listed in Tables 2-7 (see FIGS. 1B-1G). Without wishing to be bound by any particular scientific theory or this example, the third stage may be adapted to provide a desired microbial environment for the nitrification and denitrification of the effluent from the second stage. Again without wishing to be bound by any particular scientific theory or this example, the environment of the third stage is primarily aerobic when measurements are taken at the gross level, but at the microscopic level, there may exist anaerobic zones or sites.

In certain examples, the extensive root system of the plants in the third stage provides a significant substrate for layers of bacteria that metabolize complex carbon compounds, or convert ammonia to nitrate, or convert nitrate to nitrogen gas. Since most of the bacteria used in the treatment process are attached growth microorganisms, the substrate provided by the plant may greatly increase the overall efficiency of the process. Complex layering of bacteria on the fine root hairs may allow various metabolic processes to occur that may not ordinarily occur. For example, molecular oxygen introduced by the plants into the fine root hairs becomes available for nitrifying (aerobic) bacteria, while bacteria several layers removed might be denitrifiers that may convert nitrate to nitrogen gas. Without wishing to be bound by any particular scientific theory or this example, kinetic constraints that normally apply in systems with less substrate are increased several times over a pond system without plants. As a result, the usual requirements for nitrification, e.g., CBOD<30 mg/L, that normally apply to waste treatment systems are not applicable to pond systems with a floating plant ecology. Although grab samples may in certain instances or times exceed 30 mg/L COD, the micro environmental conditions on the root hairs of the hyacinths are such that nitrification routinely occurs.

In order to provide oxygen for more efficient nitrification, an aeration system, e.g., a diffused aeration system, may be used and periodically switched on. Because of the high carbon content, and anoxic and anaerobic zones within the third stage, denitrification may also occur. Without wishing to be bound by any particular scientific theory or this example, the detention times in the third stage are typically about 10-15 times longer than in a typical activated sludge systems, but the external energy requirements of the third stage are substantially less than those of a septage or sludge treatment system incorporating an activated sludge system for comparable levels of water quality.

In accordance with certain examples, a waste treatment system configured to treat domestic sludge and/or septage using a total external energy input of less than about 60-80 kilowatts per 100 cubic meters of domestic sludge and/or septage also includes a fourth stage in fluid communication with the third stage. In certain examples, the fourth stage may be configured to further oxidize carbon and nitrogen compounds in effluent received from the third stage. In some examples, such further oxidation of carbon and nitrogen compounds may be performed using a pump discharging about 8 to about 11 liters per minute per cubic meter of sludge processed per day. In certain examples, the fourth stage uses less than about 16 kilowatts per day per 100 cubic meters of processed septage and/or sludge.

In accordance with certain examples and because septage and/or sludge may contain nitrogen concentrations that are 5-10 times more than nitrogen concentrations found in normal domestic wastewater, additional nitrification and denitrification may be necessary. Without wishing to be bound by any particular scientific theory or this example, one method that may be used to nitrify the septage and/or sludge is to use biological processes of microorganisms. For example, attached growth microorganisms that are grown using suitable media enclosed in a suitable housing, such as, for example, a tower, may be used to nitrify the septage and/or sludge. In certain examples, effluent from the back end of the third stage may be sprayed onto the media in the housing, and then routed back to the front end of the third stage, i.e., the influent end of the third stage where effluent from the second stage is introduced. This process creates a trickling filter that relies primarily on nitrifying organisms such as *Nitrosomonas, Nitrobacter, Nitrosolubus, Nitrosospira, Nitrosouva, Streptomyces* and *Nocardia*. Suitable media for growing such microorganisms include, for example, plastic media composed of high density polyethylene, or polypropylene, or natural materials such as rock, scoria, wood, oyster shells, and the like. Additional microorganisms and media for growing such microorganisms will be readily selected by the person of ordinary skill in the art, given the benefit of this disclosure.

In accordance with certain examples, a waste treatment system configured to treat domestic sludge and/or septage using a total external energy input of less than about 60-80 kilowatts per 100 cubic meters of domestic sludge and/or septage further includes a fifth stage in fluid communication with the fourth stage. In certain examples, the fifth stage may be adapted to receive water soluble oxidized nitrogen and carbon compounds and suspended solids, and remove these compounds and solids without the use of any external input of energy.

In accordance with certain examples, the fifth stage may include a suitable amount and type of organisms to provide an ecology representative of wetlands. For example, the fifth stage may include emergent plants and microbial communities commonly found in a wetlands environment. Exemplary emergent plants and microbial communities include, but are not limited to, *Typha* spp, *Schoenplectrus* (a.k.a. *Scirpus*) spp, *Phragmites* spp., *Arundo donax, Carex* spp., *Sparganium* spp., *Juncus* spp., *Phalaris arundinacea, Spartina* spp., *Cyperus halei, Polygonum* spp., *Equisetum* spp., *Salix exegua* and the like. Without wishing to be bound by any particular scientific theory or this example, the microbial community may grow on a suitable substrate, e.g., a gravel substrate, and the root hairs of the wetlands plants. The gravel also anchors the wetlands plants and provides a suitable growing media for the plants. Again without wishing to be bound by any particular scientific theory or this example, the primary function of the fifth stage is denitrification. Other processes that take place in the fifth stage include, but are not limited to, phosphorus removal, pathogen removal (bacterial, viral, helminthes) by predation and adsorption, suspended solids reduction, and CBOD reduction. Also, any remaining water soluble metals may be deposited in the fifth stage, e.g., in the form of metal sulfides by sulfate reducing bacteria, such as, *Desulfovibrio* and *Desulfotomaculum*, for example. The person of ordinary skill in the art, given the benefit of this disclosure, will be able to design suitable fifth stages for use in the waste treatment systems disclosed herein.

In accordance with certain examples, a waste treatment system configured to treat domestic sludge and/or septage using a total external energy input of less than about 60-80 kilowatts per 100 cubic meters of domestic sludge and/or septage also includes a sixth stage in fluid communication with the fifth stage. In certain examples, the fifth stage is configured to remove any remaining carbon and nitrogen compounds, suspended solids, and pathogenic organisms. In some examples, the sixth stage may use a pump configured to discharge at a rate of about 8-11 L per minute per cubic meter of sludge and/or septage. In yet other examples, the total external energy input in the sixth stage is about 16-20 kilowatts per 100 cubic meters of fluid.

In accordance with certain examples, the sixth stage may include an environment similar to the environment commonly found in the sands and gravel of a riparian corridor, such as the illustrative riparian corridor described in Brookes, Andrew, and F. Douglas Shields, Jr., "River Channel Restoration" pub. by J. W. Wiley, New York, N.Y. 1966, or NRCS NEH 654 Stream Restoration Handbook, the entire disclosure of each of which is hereby incorporated herein by reference for all purposes. In certain examples, fluid may be periodically recycled through one or more sand beds in an aerobic environment where attached growth organisms, e.g., bacteria, ciliates, macro invertebrates (e.g., ostracods, copepods, tardigrads, etc.), feed on remaining organic matter, including pathogens and viruses. Without wishing to be bound by any particular scientific theory or this example, reversing the ecosystem oxidation reduction potential (ORP) from the fifth stage to the positive ORP of the sixth stage allows an entirely different population of microorganisms to thrive. Although there are some similarities between the fifth and sixth stages, a primary function of the sixth stage is final removal of suspended solids and oxidation of any remaining soluble carbon compounds. Because of the ideal conditions for ciliates and other microinvertebrate filter feeders, any remaining free swimming microorganisms, including, for example, pathogens, algae, viruses, oocysts and spores, become food for the organisms in the sixth stage. It will be within the ability of the person of ordinary skill in the art, given the benefit of this disclosure, to select suitable organisms for use in the sixth stage such as, for example, rotifers, nematodes, Oligochaeta, Acaria, Amoeba, and protozoa (see, e.g., Table 5 (FIG. 1E)) and the like.

In accordance with certain examples, the effluent from the sixth stage may be used for numerous purposes including, but not limited to, irrigation, cooling water, fire protection water supply, water for flushing toilets and urinals, and the like. In some examples, depending on the water quality it may be desirable to further treat the effluent, using, for example, reverse osmosis or ultra-filtration or the like, such that the effluent is suitable for use as domestic water for washing and cleaning. Additional uses of the effluent from the sixth stage will be readily selected by the person of ordinary skill in the art, given the benefit of this disclosure. In yet other examples, a recycle/reflow system, as discussed below, may be used prior to release of the effluent.

In accordance with certain examples, a waste treatment system configured to treat domestic sludge and/or septage to provide treated wastewater is disclosed. In certain examples, the waste treatment system includes a plurality of stages each having a selected amount of land, an effective treatment volume or land area sufficient to accomplish a desired result. In certain examples, the waste treatment system includes a first stage configured to separate soluble gases and to deliver about 100 cubic meters of filtrate per 100 cubic meters of sludge and/or septage introduced into the first stage. In some examples, the first stage is constructed using about 50-100 square meters, e.g., about 52 to 80 square meters, of land for each 100 cubic meters of sludge and/or septage introduced into the first stage.

In certain examples, the first stage may include an equalization vessel, e.g., a tank, drum, reservoir, etc., that is configured with temperature control, e.g., by surrounding or partially surrounding the equalization vessel with a greenhouse or comparable structure to impart a substantially constant and/or selectable temperature to the equalization vessel. Without wishing to be bound by any particular scientific theory or this example, the equalization vessel may be configured to intermittently aerate and mix the septage and/or sludge in the equalization vessel. Such aeration and mixing may be accomplished using numerous methods and devices including, but not limited to, air pumps, liquid pumps, mechanical mixers and the like. Such aeration and mixing may also be continuous or discontinuous, may be automated using timers, switches and the like, and the aeration and mixing may be synchronized with delivery of fluid to another stage such that, for example, any organic solids may be transferred from the equalization vessel to another stage. Again without wishing to be bound by any particular scientific theory or this example, aeration and mixing in the equalization vessel are designed to remove any volatile organic compounds, mix and suspend organic solids and to oxidize and/or cause sulfide gases, such as hydrogen sulfide, or other volatile compounds such as solvents, petroleum hydrocarbons, found in septage, to be outgassed. In addition, the anaerobic environment of the equalization vessel can serve as a location for denitrification. In certain examples, the rate of aeration is about 0.75 HP to about 1.1 HP per 100 cubic feet of septage and/or sludge, e.g., about 0.9 HP per 100 cubic meters of septage and/or sludge, and the total aeration time is about 5-9 hours per day, e.g., about 6-8 hours per day. Additional suitable aeration rates and times will be readily selected by the person of ordinary skill in the art, given the benefit of this disclosure.

In accordance with certain examples, the first stage may also include a suitable amount and type of organisms to provide an ecology representative of the microbial ecology at the bottom of eutrophic lakes and ponds. In some examples, the microbial ecology at the bottom of eutrophic lakes and ponds is selected for its ability to provide oxidation of sulfides and nitrogen compounds. Aeration can be provided to the microbes using, for example, the exemplary aeration devices and methods discussed herein. Without wishing to be bound by any particular scientific theory or this example, periodic aeration may assist the development of a more diverse microbial environment that includes, for example, both anaerobic and aerobic organisms. Although the first stage is predominately anaerobic, there may be aerobic micro-sites that may begin to develop bacterial communities that are recycled from subsequent stages in fluid communication with the first stage. In certain examples, the fluid levels in the first stage are selected such that a fill and drain cycle which takes place, for example, over one to three days, more particularly about two days, is used. This allows for the removal of volatile and semi-volatile compounds, and oxidation or outgassing of certain noxious compounds, such as hydrogen sulfide. In certain examples, illustrative microbial ecology includes, for example, bacteria, such as those listed in Table 3, fungi, such as those listed in Table 4, protozoa, such as those listed in Table 5, insects, such as those listed in Table 6, higher fauna, such as those listed in Table 7, and the like. Additional suitable microbes and organisms for use in the first stage will be readily selected by the person of ordinary skill in the art, given the benefit of this disclosure.

In accordance with certain examples, a waste treatment system may also include a second stage in fluid communication with the first stage. In certain examples the second stage may be configured to separate solids from liquids. In some examples, the second stage is configured with about 5000-17, 500, e.g., about 5550 to 16550, square meters of land per 100 cubic meters of sludge and/or septage received on daily basis, e.g., received 365 days per year. In some examples, the percent of solids of the influent septage may vary considerably, for example, between about 1-6%, e.g., about 2%. In certain examples, the second stage may be loaded with solids at the rate of about 40-140 kg per square meter per year, e.g., about 45-135 kg per square meter per year. In certain examples, the second stage may also be configured to stabilize biosolids, mineralize nitrogen compounds, and/or reduce total volume of sludge and/or septage by at least about 90-95%.

In accordance with certain examples, the second stage of the waste treatment system may include a suitable amount and type of organisms to provide an ecology representative of delta plants. For example, one or more species of *Phragmites* (e.g., *Phragmites communis, Phragmites australis*), *Arundo* (e.g., *Arundo donax*), *Papyri* (e.g., *Papyri aegypti*), and/or *Scirpus* (e.g., *Scirpus acutus, Scirpus californicus, Scirpus validus*) plants may be included in the second stage. In certain examples, one or more microbial and invertebrate communities that are commonly associated with delta plants may also be included in the second stage. For example, illustrative microbial and invertebrate communities include, but are not limited to those listed in Tables 3-5 and, in particular, the following invertebrates: Rotifera, Nematomorpha, Nematoda, Platyhelminthes, Annelida, *Physa*, (various snails), *Daphnia, Hyalella*, Bryozoa, Oligochaeta, Chironomidae, and Lumbricidae spp. (earthworms). Without wishing to be bound by any particular scientific theory or this example, the second stage may be configured to separate organic solids from the fluid to provide dewatering and subsequent composting of the solids. Again without wishing to be bound by any particular scientific theory or this example, microbial and invertebrate activity in the second stage can reduce the volume of the sludge and/or septage by more than 90% and can mineralize nitrogen in the sludge and septage. In certain examples, solids may continue to accumulate in the second stage to a depth of about 0.5-1.5 meters, e.g., about 1.0 meter, over the course of 7-10 years. In some examples, the second stage provides solids that meet the U.S. EPA requirements for land application of Class A biosolids. (see Table 1). In certain examples, the effluent from this second stage has at least about 95% of the solids removed, at least about 90% of the carbonaceous biochemical oxygen demand (CBOD) removed, at least about 90-95% of the organic nitrogen removed, and at least about 95-99% of metals removed, including, for example, cadmium, copper, lead, zinc, and nickel. The person of ordinary skill in the art, given the benefit of this disclosure, will be able to select suitable delta plants and microbial and invertebrate communities.

In accordance with certain examples, a waste treatment system may also include a third stage in fluid communication with the second stage. In certain examples, the third stage may be configured to receive effluent from the second stage. In some examples, the third stage is configured to have an effective volume of about 3.5 to 5 cubic meters land per cubic meter of effluent received from the second stage, or an area of at least about 2.5-3.2, e.g., at least about 2.8, square meters of land per cubic meter of effluent received from the second stage. In certain examples, the third stage is configured to oxidize water soluble carbon and nitrogen compounds.

In accordance with certain examples, the third stage may include a suitable amount and type of organisms to provide an ecology representative of the ecology of subtropical and tropical ponds or lakes. In certain examples, the primary plants are water hyacinths (*Eichornia crassipes*) and associated floating and submergent pond plants, algae, attached growth microorganisms, macro and micro invertebrates, fish (e.g., *Gambusia affinis*), and amphibians. Without wishing to be bound by any particular scientific theory or this example, the third stage may be configured to provide the necessary microbial environment for the nitrification and denitrification of the effluent from the second stage. Again without wishing to be bound by any particular scientific theory or this example, the environment of the third stage is primarily aerobic when measurements are taken at the gross level; however at the microscopic level, there may be anaerobic zones or sites as well.

In certain examples, the extensive root system of the plants in the third stage removes the normal requirements for nitrification, e.g., CBOD<30 mg/L, that normally apply to waste treatment systems. Although grab samples from the water column may in some instances or times exceed 30-50 mg/L COD, the micro environmental conditions on the root hairs of the hyacinths provide significant substrate surface area for multiple layers of attached growth microorganisms. Without wishing to be bound by any particular scientific theory or this example, at the surface of the root hair, molecular oxygen passes through the plant cell membrane and becomes available for aerobic species of bacteria. Bacteria on layers immediately surrounding may also be able to receive partial amounts of oxygen provided by the plant root hairs. As layers become further removed, the genera may be anaerobic types of bacteria. The layers are typically permeable to nitrogen compounds as well as simple carbohydrates and other metabolites produced by the various genera of bacteria. In order to provide oxygen for more efficient nitrification, an aeration system, e.g., a diffused aeration system may be used and periodically switched on. Because of the high carbon content, and anoxic and anaerobic zones within the third stage, denitrification may also occur. The detention times in the third stage are typically about 10-15 times longer than in a typical activated sludge systems, but the external energy requirements of the third stage are substantially less than those of an activated sludge system for equal water quality parameters for commonly monitored and reported compounds. For compounds that are more recalcitrant, such as pharmaceuticals, human hormones, and personal care products, the additional detention time allows for increased removal of such compounds. As a result, the amount of pollutants leaving the third stage are significantly lower than the pollutants generated by an activated sludge system. This reduction is typically proportional to the kinetics of the compound in question and the detention time.

In accordance with certain examples, a waste treatment system may also include a fourth stage in fluid communication with the third stage. In certain examples, the fourth stage may be configured to receive the effluent from the third stage. In some examples, the fourth stage has an effective treatment volume of at least about 0.5 to 1.5, e.g., at least about 1, cubic meters of land per 100 cubic meters of effluent received from the third stage, or an area of at least about 1.5 to 2.5, e.g., at least about 2, square meters per 100 cubic meters of septage and/or sludge introduced into the system.

In accordance with certain examples and because septage may contain nitrogen levels that are 5-10 times more than nitrogen levels found in normal domestic wastewater, additional nitrification may be necessary. Without wishing to be bound by any particular scientific theory or this example, one method that may be used to nitrify the septage and/or sludge is to use biological processes of microorganisms. For example, attached growth microorganisms that are grown using suitable media enclosed in a suitable housing, such as, for example, a tower, may be used to nitrify the septage and/or sludge. In certain examples, effluent from the back end of the third stage may be sprayed onto the media in the housing, and then routed back to the front end of the third stage i.e., the influent end of the third stage where effluent from the second stage is introduced. This process creates a trickling filter that relies primarily on nitrifying organisms such as *Nitrosomonas, Nitrobacter, Nitrosolubus, Nitrospira, Nitrosouva Streptomyces*, and *Nocardia*. Suitable media for growing such microorganisms include, for example, plastic media such as polypropylene, polyethylene, gravel, rock, scoria, oyster and clam shells, redwood and the like. Additional microorganisms and media for growing such microorganisms will be readily selected by the person of ordinary skill in the art, given the benefit of this disclosure.

In accordance with certain examples, a waste treatment system may also include a fifth stage in fluid communication with the fourth stage. In certain examples, the fifth stage may be configured to have an area of at least about 0.5 square meters, e.g., at least about 0.4 to 0.6 square meters, per cubic meters of septage and/or sludge introduced into the system. In some examples, the fifth stage may be configured to have an effective treatment volume of at least about 0.9 to 1.1 cubic meters, e.g., about 1.0 cubic meter per cubic meter of septage and/or sludge introduced into the system.

In accordance with certain examples, the fifth stage may include a suitable amount and type of organisms to provide an ecology representative of wetlands. Illustrative wetlands are described in Mitch & Gosselink, *Wetlands, 2nd Edition*. Van Nostrand Reinhold, New York, N.Y. 1992, the entire disclosure of which is hereby incorporated herein by reference for all purposes. For example, the fifth stage may include emergent plants and microbial communities found in a wetlands environment. Exemplary emergent plants and microbial communities include, but are not limited to, *Typha* spp, *Scirpus* spp, *Phragmites* spp., *Arundo donax, Carex* spp., *Sparganium* spp., *Juncus* spp., *Phalaris arundinacea, Spartina* spp., *Cyperus halei, Polygonum* spp., *Equisetum* spp., *Salix exegua*, see, for example, Table 3 for exemplary bacteria and Table 4 for illustrative fungi, and the following invertebrates: Rotifera, Nematomorpha, Nematoda, Platyhelminthes, Annelida, *Physa*, (various snails), *Daphnia, Hyalella*, Bryozoa, Oligochaeta, Chironomidae, and Lumbricidae spp. (earthworms). Without wishing to be bound by any particular scientific theory or this example, the microbial community may grow on a suitable substrate, e.g., a gravel substrate, and the root hairs of the wetlands plants may grow in the substrate. Again without wishing to be bound by any particular scientific theory or this example, a primary function of the fifth stage is denitrification. Other processes that take place in the fifth stage include, but are not limited to, phosphorus removal, pathogen removal (bacterial, viral, helminthes) by predation and adsorption, suspended solids reduction, and CBOD reduction. Also, any remaining water soluble metals may be deposited in the fifth stage, e.g., in the form of metal sulfides by sulfate reducing bacteria, such as, *Desulfovibrio* and *Desulfotomaculum*, for example.

In accordance with certain examples, a waste treatment system may also include a sixth stage in fluid communication with the fifth stage. In certain examples, the sixth stage is configured to have a land area of at least about 2-3, e.g., at least about 2.5, square meters per cubic meter of sludge and/or septage delivered to the waste treatment system. In certain examples, the sixth stage may include an environment similar to the environment commonly found in the sands and gravel of a riparian corridor, such as the illustrative riparian corridor described in Brookes, Andrew, and F. Douglas Shields, Jr., "River Channel Restoration" pub. by J. W. Wiley, New York, N.Y. 1966, or NRCS NEH 654 Stream Restoration Handbook, the entire disclosure of each of which is hereby incorporated herein by reference for all purposes. In certain examples, fluid may be periodically recycled through one or more sand beds in an aerobic environment where attached growth organisms, e.g., bacteria, ciliates, macro invertebrates (e.g., ostracods, copepods, tardigrads, etc), feed on remaining organic matter, including pathogens and viruses. Without wishing to be bound by any particular scientific theory or this example, reversing the ecosystem oxidation reduction potential (ORP) from the fifth stage to the positive ORP of the sixth stage allows an entirely different population of microorganisms to thrive. A primary function of the sixth stage is final removal of suspended solids and oxidation of any remaining soluble carbon compounds. Because of the ideal conditions for ciliates and other microinvertebrate filter feeders, any remaining free swimming microorganisms, including, for example, pathogens, algae, viruses, oocysts and spores, become food for the organisms in the sixth stage. It will be within the ability of the person of ordinary skill in the art, given the benefit of this disclosure, to select suitable organisms for including in the sixth stage such as, for example, *Nitrosomonas, Nitrobacter, Nitrosolobus, Nitrospira, Nitrosouva, Streptomyces*, and *Nocardia* Rotifers, Nematodes, Oligochaeta, *Physa*, Acari, Hirudinea, and see, for example, Table 5 for Protozoa, and the like.

In accordance with certain examples, the effluent from the sixth stage may be used for numerous purposes, including but not limited to, irrigation, cooling tower water, fire protection, as a supply for toilets and urinals, and the like. In some examples, it may be desirable to further treat the effluent using, for example, reverse osmosis or ultra-filtration or the like, such that the effluent is suitable for use as domestic water for washing. Additional uses of the effluent from the sixth stage will be readily selected by the person of ordinary skill in the art, given the benefit of this disclosure. In yet other examples, a recycle/reflow system, as discussed below, may be used prior to release of the effluent.

In accordance with certain examples, a waste treatment system comprising a plurality of ecosystems is disclosed. In certain examples, the waste treatment system includes a first ecosystem. Without wishing to be bound by any particular scientific theory or this example, the first ecosystem is based, at least in part, on the microbial ecology at the bottom of eutrophic lakes and ponds. In some examples, the first ecosystem is configured to receive septage and sludge from which inorganic trash has been removed, e.g., by screening, filtering of the like. In certain examples, the first ecosystem may be enclosed or partially enclosed, e.g., in a greenhouse or other structure, to provide odor and temperature control, and may optionally be equipped with an air distribution system placed on the bottom of the vessel or structure that surrounds the ecosystem. For example, air may be periodically or intermittently introduced into this first ecosystem coincident with the start of pumps, or other suitable devices, that deliver the septage and/or sludge to another ecosystem in fluid communication with the first ecosystem. In some examples, periodic aeration may be used to keep solids suspended in a water column and to oxidize hydrogen sulfide and other gases produced by the eutrophic microorganisms.

In certain examples, liquid levels in the first ecosystem follow a fill and drain cycle which takes place, for example, over one to three days, more particularly about two days. Without wishing to be bound by any particular scientific theory or this example, utilization of fill and drain cycles allows for the uniform application of solids onto the second ecosystem. In addition, an average retention time of approximately two days allows for the oxidation of hydrogen sulfide, and oxidation or outgassing of volatile and semi-volatile compounds such as petroleum hydrocarbons, solvents, and other similar hydrocarbon compounds often found in septage. Again without wishing to be bound by any particular scientific theory or this example, periodic aeration may assist in the development of a more diverse microbial environment that includes, for example, both anaerobic and aerobic organisms. Although the first ecosystem is predominately anaerobic, there may be many anoxic aerobic micro-sites that may begin to develop bacterial communities that are recycled from subsequent ecosystems in fluid communication with the first ecosystem.

In accordance with certain examples, the waste treatment system may further include a second ecosystem in fluid communication with the first ecosystem. In certain examples, septage and sludge are pumped from the first ecosystem to the second ecosystem. In some examples, the second ecosystem is based, at least in part, on the ecology of delta plants including, but not limited to, *Phragmites communis, Phragmites australis, Arundo donax, Papyri aegypti, Scirpus acutus, Scirpus californicus, Scirpus validus*, and microbial and invertebrate communities commonly associated with such delta plants or selected or desired additional organisms, such as those listed in Table 2-7, for example. This second ecosystem, referred in some instances as a reed bed, is configured to separate organic solids from the fluid to provide dewatering and subsequent composting of the solids. Without wishing to be bound by any particular scientific theory or this example, microbial and invertebrate activity can reduce the volume of the sludge and septage by more than 90% and can mineralize nitrogen in the sludge and septage. Solids may continue to accumulate in this ecosystem to a depth of about 0.5-2 meters, e.g. about 1.0 meter, over the course of 7-10 years. In certain examples, the second ecosystem provides solids that meet the U.S. EPA requirements for land application of Class A biosolids (see Table 1). The effluent from this second ecosystem typically has more than 95% of the solids removed, over 90% of the carbonaceous biochemical oxygen demand (CBOD) removed, over about 90% of the nitrogen removed, and more than about 95-99% of metals removed, including, for example, cadmium, copper, lead, zinc and nickel. The remaining effluent may be delivered to a third ecosystem under gravity feeding, by pumping, through fluid conduits, such as pipes or other suitable methods of delivering a fluid from the second ecosystem to a third ecosystem that will be readily selected by the person of ordinary skill in the art, given the benefit of this disclosure.

In accordance with certain examples, a third ecosystem in fluid communication with the second ecosystem may be used. In certain examples, the third ecosystem is based, at least in part, on the ecology of subtropical and tropical ponds in which the primary plants are water hyacinths (*Eichornia crassipes*) and associated floating and submergent pond plants, algae, attached growth microorganisms, macro and micro invertebrates, fish (primarily *Gambusia affinis*), and amphibians. Additional suitable organisms are listed in Tables 2-7. The third ecosystem is referred to in some instances as a hyacinth lagoon. Without wishing to be bound by any particular scientific theory or this example, the third ecosystem may be adapted to provide the necessary microbial environment for the nitrification and denitrification of the effluent received from the second ecosystem. The environment of the third ecosystem is primarily aerobic when measurements are taken at the gross level; however at the microscopic level, there may exist anaerobic zones. In addition, because of the significant amount of substrate provided by the water hyacinth root system, CBOD may be reduced further.

One of the benefits of this extensive root system is that normal requirements for nitrification, e.g., CBOD<30 mg/L, is not operative in the gross macro sense normally applied to existing waste treatment systems. Although grab samples from the water column may in some instances or times exceed 30-50 mg/L COD, the micro environmental conditions on the root hairs of the hyacinths provide significant substrate surface area for multiple layers of attached growth microorganisms. Without wishing to be bound by any particular scientific theory or this example, at the surface of the root hair, molecular oxygen may pass through the plant cell membrane and becomes available for aerobic species of bacteria. Bacteria on layers immediately surrounding may also be able to receive partial amounts of oxygen provided by the plant root hairs. As layers become further removed, the genera may be anaerobic types of bacteria. The layers are typically permeable to nitrogen compounds as well as simple carbohydrates and other metabolites produced by the various genera of bacteria. In order to provide oxygen for more efficient nitrification, an aeration system, e.g., a diffused aeration system, may be used and periodically switched on. Because of the high carbon content, and anoxic and anaerobic zones within the hyacinth lagoon, denitrification may also occur. Unlike activated sludge systems which continually shear the microbial floc and disrupt the development of symbiotic microbial ecosystems, the substrate provided by the root hairs of the hyacinth plant allows symbiotic layers of bacteria to develop and remain in place over relatively long periods of time, e.g., about 12 months. The detention times in the third ecosystem are typically about 10-15 times longer than in a typical activated sludge systems, but the external energy requirements of the third ecosystem are substantially less than those of an activated sludge system. In addition, a significant advantage of the longer detention time and the complex ecology of the third ecosystem is the ability of the ecosystem to transform recalcitrant pollutants that typically take more than 8 hours to treat in an activated sludge treatment systems. The kinetics of biological degradation for almost all of the priority pollutants (some 1200 or more compounds) are well known and are directly related to detention times. In certain examples, the micro-ecology of the lagoon provides superior results compared to those provided with activated sludge systems, and due to the much longer detention time the water quality is improved.

In certain examples and because septage may contain nitrogen concentrations that are 5-10 times higher than those found in normal domestic wastewater, additional nitrification may be necessary. Without wishing to be bound by any particular scientific theory or this example, an energy efficient method to accomplish this is to rely on attached growth microorganisms that are grown using suitable media, e.g., polypropylene media, enclosed in a suitable housing, such as, for example, a tower. Fluid from the back end of the third ecosystem may be sprayed onto the media in the tower, and then piped back to the front end of the third ecosystem, i.e., the influent end of the ecosystem when effluent from the second ecosystem is introduced. This process creates a trickling filter that relies primarily on nitrifying organisms such as *Nitrosomonas, Nitrobacter, Nitrosolobus, Nitrospira, Nitrosouva, Streptomyces*, and *Nocardia*. Without wishing to be bound by any particular scientific theory or this example, the microbial community can grow on a gravel substrate and the root hairs of the wetlands plants which can grow in the gravel. Again without wishing to be bound by any particular scientific theory or this example, a primary function of the wetlands is to denitrify the fluid. Other processes that take place in the fourth ecosystem include, but are not limited to, phosphorus removal, pathogen removal (bacterial, viral, helminthes) by predation and adsorption, suspended solids reduction, and CBOD reduction. Also, any remaining water soluble metals may be deposited typically in the form of metal sulfides by sulfate reducing bacteria, such as, *Desulfovibrio* and *Desulfotomaculum*, for example.

In accordance with certain examples, effluent from the fourth ecosystem may be discharged into a fifth ecosystem in fluid communication with the fourth ecosystem. In certain examples, the fifth ecosystem is adapted to be similar to the environment commonly found in the sands and gravel of a riparian corridor, such as the illustrative riparian corridor described in Brookes, Andrew, and F. Douglas Shields, Jr., "River Channel Restoration" pub. by J. W. Wiley, New York, N.Y. 1966, or NRCS NEH 654 Stream Restoration Handbook, the entire disclosure of each of which is hereby incorporated herein by reference for all purposes. In an exemplary configuration, water may be periodically recycled through one or more sand beds in an aerobic environment where attached growth bacteria, ciliates, macro invertebrates, e.g., ostracods, copepods, tardigrads, etc. feed on remaining organic matter, including pathogens and viruses. Additional organisms that may be included in the fifth ecosystem are listed in Tables 2-7. Without wishing to be bound by any particular scientific theory or this example, reversing the ecosystem oxidation reduction potential (ORP) from the wetlands to the positive ORP of the sand filter allows an entirely different population of microorganisms to thrive. Although there are some similarities between the fourth and fifth ecosystems, e.g., nitrification and denitrification, the primary functions of the fifth ecosystem are final removal of suspended solids and oxidation of any remaining soluble carbon compounds. Because of the ideal conditions for ciliates and other microinvertebrate filter feeders in the fifth ecosystem, any remaining free swimming bacteria, pathogens, algae, viruses, oocysts and spores become food for these organisms. Adsorption of pathogens by other micro-organisms is an advantage as this process results in the complete destruction of the pathogens by rearranging cellular material into the building blocks of cellular development of the predatory organism.

In certain examples, some portion of the final effluent may be recycled to the first ecosystem, e.g., to dilute incoming septage, and the rest of the effluent is suitable for reuse as irrigation water, fire protection, cooling tower water, urinals and toilets, or the like. In effluent exiting the last ecosystem, suspended solids and CBOD are typically reduced by more than 99% and are often non-detectable. In certain examples, all forms of nitrogen existing the system total less than about 10 mg/L.

In accordance with certain examples, any of the configurations disclosed herein may optionally include a recycle/return flow to the first stage. In certain examples, the recycle/return flow is placed downstream of the fifth stage and may be in fluid communication with both the fifth stage and the first stage. Without wishing to be bound by any particular scientific theory or this example, the recycle/return flow provides additional denitrification, dilutes the septage/sludge entering into the first stage and/or can reinoculate the first stage with microbes. It will be recognized by the person of ordinary skill in the art, given the benefit of this disclosure, that the recycle/return flow may be omitted, bypassed or turned off, in situations where additional denitrification is unnecessary or undesirable. In some examples, the recycle/reflow may be directed to stages other than the first stage, e.g., the second, third, fourth, fifth sixth stages or other stages. The person of ordinary skill in the art, given the benefit of this disclosure, will be able to design suitable waste treatment systems that include recycle/return flow.

In accordance with certain examples, an exemplary waste treatment system is shown in FIG. 2A. Waste treatment system includes screening device 110 in fluid communication with holding tank 120. In some examples, screening device 110 is in fluid communication with a plurality of holding tanks or multiple screens may be used. In certain examples, screening device 110 is configured to remove inorganic and organic trash and grit. For example, domestic sludge or septage may include trash such as mops, plastics, rags, bottle caps and other household waste. The screening device 110 may be configured to remove items such trash and can also remove sand, gravel and grit. Removal of such material ensures that subsequent treatment processes are not contaminated by such non biodegradable material. Exemplary screening devices are available from companies such as, for example, JWC Environmental (Costa Mesa, Calif.), or Franklin Miller (Livingston, N.J.). In some examples, screening device 110 is placed upstream of holding tank 120 such that septage first flows through screening device 110 and then into holding tank 120, whereas in other examples, holding tank 120 is upstream of screening device 110 so that septage is first placed into holding tank 120 prior to any screening using screening device 110.

Screening device 110 and holding tank 120 are typically in fluid communication through fluid conduit 115. Holding tank 120 is configured to receive septage from one or more septage and/or sludge haulers, or can be configured to receive septage from municipal or industrial septage lines. In certain examples, holding tank 120 is configured to receive from about 5000 L to about 12,000 L of waste, more particularly about 7000 L to about 10,000 L of waste, e.g., about 5700 L to about 11,355 L of waste or about 7400 L to about 9500 L of waste. Suitable holding tanks are available from numerous commercial suppliers including, for example, local concrete septic tank manufacturers, Norwesco (St. Bonifacius, Minn.), Accu-Tanks & Equipment Co. (Williams, Oreg.) and the like.

In accordance with certain examples, holding tank 120 is in fluid communication with equalization tank 130 through fluid conduit 125. In certain examples, equalization tank 130 is configured to provide odor and temperature control and may optionally be positioned within a greenhouse or other temperature selected or temperature controlled environment.

Equalization tank 130 may include aeration equipment such as pumps, sprayers, mixers, regenerative blowers, piston air compressors, or rotary lobe compressors. The equalization tank can be aerated intermittently or continuously. Without wishing to be bound by any particular scientific theory or this example, the equalization tank may be aerated to remove volatile organic compounds, mix and suspend organic solids, and oxidize and cause to be outgassed sulfides, such as hydrogen sulfide. The anaerobic environment of the equalization tank also may serve to denitrify the effluent. To provide an environment that is at least partially anaerobic, the tanks may be aerated intermittently, e.g., the tanks can be aerated at about 0.9 HP/100 cubic meters of septage for about 6-8 hours/day. Such aeration may be controlled manually or may be automated using a timer or other suitable device.

Equalization tank 130 may be in fluid communication with reed bed 140 through fluid conduit 135. Without wishing to be bound by any particular scientific theory or this example, reed bed 140 is configured to dewater and provide in-situ composting of solids. The reed bed can remove at least about 97% of the solids and carbonaceous biochemical oxygen demand.

The reed bed is typically passive and requires no external energy input, which reduces the overall cost of the waste treatment system. Solids may be removed from the reed bed after approximately 7-10 years and placed, for example, in a windrow for 90 days. The stabilized solids typically meet U.S. EPA regulations under 503(a) regulation for the land application of solids.

In certain examples, reed bed 140 includes a floor comprising a plurality of layers. For example, the reed bed floor can include one or more gravel layers and one or more sand layers. In some examples, the reed bed floor includes two layers of gravel, wherein each layer may be the same or different type of gravel, covered by an upper sand layer. In certain examples, various plant species may be planted in the upper sand layer including, but not limited to, *Phragmites communis, Scirpus acutus, Scirpus californicus, Arundo donax, Typha domingensus, Salix exegua* and other suitable emergent wetland plants. Other organisms, such as those listed in Tables 2-7, may also be present. Again without wishing to be bound by any particular scientific theory or this example, plant roots penetrate the sand and provide additional substrate for filter feeding micro-invertebrate populations and microbial populations that metabolize soluble organic compounds. The stems of the plants aid in keeping the organic solids from forming an impermeable crust. Shading provided by the stems and leaves of the plants ensures that some moisture remains in the bio-solids on the surface.

In certain examples, the loading rate of the reed bed can vary depending on the size of the reed bed, the number of plants present, etc. In certain examples, the loading rate of the reed bed is about 45 kg per m$^2$ per year to about 135 kg per m$^2$ per year. In accordance with certain examples, reed bed 140 is in fluid communication with hyacinth lagoon 150 through 50 mm to 200 mm diameter piping 145. Equalization tank 130 may also be in fluid communication with hyacinth lagoon 140 through fluid conduit 135. Without wishing to be bound by any particular scientific theory or this example, hyacinth lagoon 150 is configured to treat water soluble organic compounds, suspended organic solids, fats, oils, and grease, and to remove pathogens, carbon, nitrogen and phosphorous from the wastewater. The hyacinth lagoon typically includes aquatic plants, algae, aquatic invertebrates and microorganisms. For example, the hyacinth lagoon may include one or more hyacinth species, such as *Crassipes eichornia*, and/or other floating pond plants, such as, for example, *Axolla, Lemma, Salvinia, Salix, Nuphar, Anacharis, Elodea, Potamogeton, Ludwigia, Hydrocotyle, Ranunculus, Nasturtium, Najas, Polygonum, Pistia stratoides, Potentilla palustries* (Cinquifoil), *Utricularia* (bladderwort), *Myriophyllum* (milfoil), *Ceratophyllum* (horworts), *Salicornia* (glassworts), *Callitriche* (starworts) and *Viola lanceolata* (water violet). Additional suitable floating pond plants will be readily selected by the person of ordinary skill in the art, given the benefit of this disclosure. Additional selected or desired organisms, such as those listed in Tables 2-7, may also be included in the hyacinth lagoon. Again without wishing to be bound by any particular scientific theory or this example, the roots of the plants provide significant substrates for attachment and growth of microorganisms that can aid in treatment of the wastewater. For example, root length on each mature hyacinth may exceed 10,000 miles, and this surface may be colonized by attached growth micro-organisms.

In certain examples, the hyacinth lagoon can be mixed and/or aerated using suitable mixing equipment and aeration devices. Mixing and aeration can encourage microbial diversity. Mixing and aeration may be performed continuously or intermittently. In certain examples, mixing and aeration is intermittent so that microbial colonies are less likely to be damaged by shearing forces. It will be recognized by the person of ordinary skill in the art, given the benefit of this disclosure, that aeration rates are variable due to the variable nature of the septage and/or sludge. In certain examples aeration levels are kept sufficient to maintain a positive oxidation reduction potential (ORP) in the hyacinth lagoon.

In accordance with certain examples, hyacinth lagoon 150 is in fluid communication with trickling filter 160 through fluid conduit 155 and fluid conduit 156. In certain examples, fluid conduit 155 is configured to carry fluid from hyacinth lagoon 150 to trickling filter 160, whereas fluid conduit 156 is configured to carry fluid from tricking filter 160 back to hyacinth lagoon 150. Trickling filter 160 is operative to oxidize carbon and nitrogen compounds that remain in the water and to destruct any residual anaerobic pathogens in the water using by increasing the oxygen content of the water. Another function of trickling filter 160 is to ensure that remaining organic nitrogen or ammonia compounds are oxidized by attached growth nitrifying organisms that grow on the trickling filter media. In certain examples, water from hyacinth lagoon 150 is pumped to a cylindrically shaped vertical tower that contains an artificial media in about a 3.75 meter high tower. Water drains back into the hyacinth lagoon where some denitrification takes place. The return flow from the trickling filter provides aerated and nitrified water that adds additional oxygen for further treatment and oxidation of remaining carbon compounds in the water in the hyacinth lagoon.

In certain examples, the cycle time of the trickling filter may be variable and may be controlled with a programmable timer or other suitable device such that the conversion of NH$_4$, or other nitrogen compounds, to nitrates can be controlled or regulated. In some examples, the recycle rate is selected such that the total daily volume of water is cycled through the trickling filter at least about 2 times, more particularly at least about 3 times, e.g., about 4-5 times. In certain examples, the loading rate of the media is about 6.4 kg BOD per cubic meter per day.

In accordance with certain examples, hyacinth lagoon 150 is also in fluid communication with subsurface flow wetland 170 through fluid conduit 165. A primary function of the wetland is to remove remaining nitrates, suspended solids, soluble organic compounds, phosphorus, petroleum hydrocarbons, any soluble metals, and pathogens including microbial and viral. In some examples, effluent from the hyacinth lagoon in the greenhouse overflows into subsurface flow wetland 170. Gravel and the roots of the wetlands plants provide significant substrate for attached growth microorganisms. The microorganisms necessary for the treatment of the hyacinth pond effluent, including biological removal or modification, are found in nature in similar natural wetlands habitats, such as those described in Mitch & Gosselink, *Wetlands, 2nd Edition*. Van Nostrand Reinhold, New York, N.Y. 1992, the entire disclosure of which is hereby incorporated herein by reference for all purposes, and those organisms listed in Tables 2-7. This is a passive treatment element requiring little or no maintenance, and no external energy input. Significant additional substrate is provided by wetlands plants whose roots penetrate the gravel bed. The wetlands plants include, but are not limited to, *Typha* spp, *Phragmites communis, Scirpus* spp., *Arondo donax, Salix exegua*, and *Carex* spp. Additional suitable organisms, such as those listed in Tables 2-7, may also be present in the wetlands. The constructed wetlands may be sized for a particular organic and hydraulic loading rate which may be, for example: Organic Loading Rate=90 kg per hectare per year, Hydraulic Loading Rate=12 cm per day and Hydraulic Retention Time=2.5 days.

In accordance with certain examples, subsurface flow wetland 170 is in fluid communication with recirculating sand filter 180 through fluid conduit 175. The recirculating sand filter functions to remove all remaining suspended solids and CBOD. Generally all surviving fecal coliform bacteria and pathogens are removed as well. Water quality is designed to meet state standards for the land application of treated effluent. Sand filters provide excellent substrate for attached growth microorganisms, especially ciliates and rotifers, that are excellent filter feeders. One advantage of using these microorganisms for disinfection and removal of pathogens is that unlike chlorine, or ultraviolet light, the DNA of the pathogen is completely rearranged by the filter feeder's digestive system. In certain examples, loading rates are dependent on the water quality of the previous treatment steps, and the state requirements for land application of the treated effluent. Without wishing to be bound by any particular scientific theory or this example, the lower the loading rate, the better the water quality of the final effluent. Current loading rates can vary, for example, from about 200-400 liters per square meter per day, e.g., about 400 liters per square meter per day.

In accordance with certain examples, an optional recycle/reflow stage 190 is shown in FIG. 2A. Recycle/reflow stage 190 is in fluid communication with equalization tank 120 through fluid conduit 191. Recycle/reflow stage 190 is also in fluid communication with constructed wetland 170 and recirculating sand filter 180 through fluid conduit 192 and fluid conduit 193, respectively. Without wishing to be bound by any particular scientific theory or this example, recycle/reflow stage 190 can provide fluid to equalization tank 130 to dilute incoming sludge and/or septage.

It will be recognized by the person of ordinary skill in the art, given the benefit of this disclosure, that additional stages may be included in the examples of the waste treatment systems provided herein. In certain configurations, such additional stages may be intervening in that they are positioned between two or more stages disclosed above, or may be upstream of an initial stage or downstream of a final stage. Exemplary additional stages include, but are not limited to, intervening filtration stages, anti-microbial and anti-pathogen stages, chemical treatment stages, reverse osmosis, distillation, and pre-filtering stages, using, for example, screens, filters or degrit chambers. For example, in normal operation of a hyacinth lagoon, plants are harvested weekly. Harvested plants can be dried and composted with little economic value added. However, dried hyacinths can provide an excellent substrate for growing certain species of fungi, such as mushrooms. To take advantage of the possible reordering of the basic elements in the dried hyacinths, the plants may be dried, chopped up, and pasteurized in preparation for inoculation by any of various species of food and medicinal fungi. Bags of inoculated hyacinths may be placed in a growing room where temperature, light and humidity are controlled for optimal growth. Mushrooms may be periodically harvested with multiple flushes common. Spent mushroom substrate may then be combined with sludge from the reed bed for vermiculture.

Without wishing to be bound by any particular scientific theory or this example, earthworms are capable of processing sludge from the reed bed and turning the sludge into pathogen free castings that are a very valuable soil amendment. When kept in dark enclosures at 60-70° F., the earthworms can process the sludge and any other organic material while at the same time producing huge increases in worm populations. For example, in about three weeks, earthworms can completely process all of the sludge or sludge/mushroom substrate producing a soil amendment that can be sold for 7-10 times the amount that composted sludge may be sold.

In accordance with certain examples, a process of treating septage and/or sludge is disclosed. In certain examples, the first stage, e.g., an equalization vessel, includes an air distribution or aeration system consisting of a network of about 50-100 mm diameter PVC piping drilled with about 3-6 mm diameter holes. In some examples, the aeration system is intermittently supplied with volume of air equal to about 4-8 cubic meters per 100 cubic meters of septage and/or sludge introduced into the first stage. In certain examples, the air is controlled by a timing device that allows the air to be supplied about 4-8 times per day for a total aeration time of about 240 to 480 minutes duration. About 2-10 minutes after the start of the aeration system, one or more pumping devices may be turned on to pump septage/sludge for about 15-35 minutes, e.g., about 16-33 minutes, at a combined rate of about 700-800 liters per min per 100 cubic meters of septage/sludge received per day.

In accordance with certain examples, the third stage, e.g., hyacinth lagoon, may also be configured with an aeration system. In certain examples, the third stage includes an aeration or an air distribution system that includes a network of about 2 fine bubble aeration devices per square meter of surface area. In some examples, the fine bubble aeration devices are located at the front ⅓ of the third stage. In additional examples, the aeration system is intermittently supplied with volume of air equal to about 30-60 liters per minute per 100 cubic meters of septage/sludge delivered per day. In certain examples, the air supply may be controlled by a timing device that allows the air to be supplied 4-8 times per day for about a 60-90 minute duration per cycle. In accordance with certain examples, the fourth stage, e.g., a trickling filter, may include a suitable amount and type of media to allow for microorganisms growth.

In certain examples, the fourth stage includes about 4-4.5 cubic meters of polypropylene media placed in a vertical tower 0.75 to 1.1 meters in diameter and 3-4 meters in height. In some examples, the fourth stage may be intermittently dosed with fluid from the third stage by one or more pumping devices, optionally controlled by a timing device. In certain examples, the pumping device pumps at the rate of about 800 liters per minute per 100 cubic meters of sludge and/or septage received per day for about 80-150, e.g., about 90 to 144, times per day for about 3-4 minutes per "ON" cycle.

In accordance with certain examples, the sixth stage may include a recirculating sand filter configured with about 140-155, e.g., about 147, cubic meters of washed sand per 100 cubic meters of sludge, with an effective size of $D10$=1.5 to 2.5 mm ($D10$ is the size at which 10% of the sand passes a given sieve size). In some examples, the sand is placed in a rectangular bed on top of 9 mm and 18 mm pea gravel with a 100 mm PVC drain pipe. In certain examples, the depth of the sand is about 30 cm to about 60 cm deep. In yet other examples, the sand may be intermittently dosed by a network of 25-50 mm diameter PVC piping placed in rows and drilled with 3-6 mm diameter holes 37-62 cm on center. In some examples, dosing of the sand filter at the rate of about 400-800 liters per square meter per day may be accomplished by one or more pumping devices, optionally controlled by a timing device, at a rate of about 700-800 liters per min per 100 cubic meters of septage and or sludge received per day.

In accordance with certain examples, a recycle/return flow may optionally be used with any of the illustrative configurations disclosed herein. In certain examples, a selected volume of treated effluent is recycled at the rate of about 100,000 to 300,000 liters per day per 100 cubic meters of septage/sludge received per day. In some examples, the recycling may be accomplished using one or more pumping devices optionally controlled by a timing device to return treated effluent to the first stage, or another selected stage, at a rate of about 800 liters per min per 100 cubic meters of septage and/or sludge received per day. In some examples, the effluent is recycled back to a selected stage using a 25-45 cm diameter PVC pipe. In certain examples, the recycled effluent is injected with air using a venturi device that uses the pump pressure head to create a vacuum in the recycle line. In some examples, ambient air or oxygen is injected into the recycled water at a suitable rate to ensure that that the water is substantially saturated with oxygen.

Certain specific examples are described in more detail below to further illustrative the exemplary aspects and examples disclosed herein.

SPECIFIC EXAMPLE 1

An exemplary waste treatment system was constructed as described below. A mechanical screen was manufactured by welding a ¼ inch×2 feet steel flat bar so that the spacing between the bars was ¾ inch for one screen and ⅜ inch for a second screen. A holding tank consisted of the bottom half of a 1500 gallon concrete tank, purchased from Montano (Santa Fe, N. Mex.). The concrete tank was divided into two equal portions by placing a ¼ inch steel plate down the middle of the concrete tank. A 30 degree "V" notch weir was cut into the dividing plate allowing septage to flow from one side to the other. The larger bar screen was placed in the right hand side of the tank and the smaller bar screen was placed on the left hand or discharge side of the concrete tank. The holding tank was placed in fluid communication with an equalization tank that was constructed on site using stabilized native soil and a 30 mil PVC liner, obtained commercially from The Snow Company (Albuquerque, N. Mex.). An earthen equalization tank 230 (see FIG. 2B) was constructed on site by excavating a rectangular hole having a volume of about 14.2 cubic meters and lining the hole with the 30 mil PVC liner. The equalization tank was configured with an air distribution system 236 using 50 mm diameter PVC piping having 6 mm holes drilled 30 cm on center. The screening device was placed in fluid communication with the equalization tank 230 (see FIG. 2B) using 100 mm diameter PVC pipe 232 having a length of 3 meters and obtained from Dahl Wholesale Plumbing Supply (Santa Fe, N. Mex.) by coupling a discharge port on the mechanical screen to one end of the pipe and coupling an inlet port on the equalization tank 230 to the other end of the pipe.

A reed bed (see 240 in FIG. 2C) having an area of about 116 square meters was constructed by excavating a 116 square meter basin which was then lined with a 30 mil PVC liner. A 100 mm diameter PVC drainfield pipe, such as drainfield pipe 244 in FIG. 2C, was placed on top of the liner space at the center. A layer of 18 mm gravel 19 cm deep was placed on top of the drainfield pipe. This was in turn covered by another layer of 9 mm pea gravel to the depth of about 12 cm. On top of this layer of gravel, a layer of coarse sand 25 cm deep was placed. The reed bed 240 was configured to receive discharge from the equalization tank 230 by a pump 234 through 50 cm PVC piping 238 from the equalization tank 230 to a network 242 of 50 cm PVC piping placed on the coarse sand. The piping network 242 was placed so that two parallel lines of piping placed at intervals equal to ¼ of the width of the reed bed were connected by a header pipe constructed of 50 mm diameter PVC piping. Risers, constructed of 50 mm PVC pipe having a of 1.0 m, were attached to the distribution network such that each of the four risers were equidistant from each other, and the distance from the edge of the length was ¼ of the length, and from the edge of the width, ¼ of the length. Sludge and septage were pumped from the equalization tank by a ½ hp effluent pumped 234 manufactured by Myers Pump, and obtained from TP Pump (Albuquerque, N. Mex.). The pump operation is controlled by a timing device and by mercury float switches located in the equalization tank. Table 3 provides list of some of the illustrative microbial genera found in the septage.

A hyacinth lagoon 250 (see FIG. 2B) having an area of about 19 square meters, and a volume of approximately 1000 L was constructed by excavating a rectangular basin in the native soil and lining the basin with a 30 mil PVC liner obtained from Snow and Company (Albuquerque, N. Mex.). The hyacinth lagoon optionally may be supplied with a network of fine bubble diffusers, such as fine bubble diffuser 255, each capable of providing 300 L/min. The hyacinth lagoon was configured to receive discharge from the reed bed 240 by 100 mm diameter PVC pipe 256 in fluid communication with the underdrains of the reed bed. The hyacinth lagoon was planted with water hyacinths (*Eichornia crassipes*), Duckweed, (*Lemma* spp.), *Azolla*, and *Elodae densis*.

The hyacinth lagoon was in fluid communication with a trickling filter 260 (see FIGS. 2B, 2D and 2E) constructed through a 50 mm diameter, 3.75 meter long reinforced PVC drain pipe 253, manufactured by Johns Manville, and obtained from Dahl Plumbing Supply. The trickling filter 260 was filled with polypropylene media manufactured by Clarkson Controls (Farmington Mich.). Effluent from the hyacinth lagoon was pumped using pump 251 to the trickling filter 260 through 50 mm diameter PVC 262 using a ½ hp Myers pump, model ME 50, obtained from TP pump (Albuquerque, N. Mex.), and controlled by a timing device installed in a pump control panel manufactured by SJE Rhombus, and supplied by TP Pump (Albuquerque, N. Mex.). The trickling filter returned aerated and nitrified water to the hyacinth lagoon through 200 mm PVC pipe 254, which was approximately 4 meters in length. The hyacinth lagoon 250 was also in fluid communication with a subsurface flow wetland 270 through a 200 mm pipe 252. The level of water in the hyacinth lagoon was controlled by a rotating elbow which could rotate up to 90 degrees from a vertical position.

A subsurface flow wetland 270 (see FIG. 2F) was constructed by excavation of a shallow 60 cm deep rectangular basin and placing a 30 mil PVC liner on the native compacted soil. Two 200 mm perforated pipes 271 having a length equal to the width were placed at right angles to the direction of flow. Each perforated pipe served the function of distributing and collecting the water flowing into and out of the wetland. On top of the liner, a first gravel layer of 12.5 mm to 25 mm washed and screened gravel was placed to a depth of 60 cm. Another layer of washed and screen pea gravel was placed to a depth of 12.5 cm on top of the first gravel layer. The wetland was then planted with *Typha angustafolia, Scirpus validus*, and *Phragmites communis*. Table 3 lists representative microorganism present in the wetland. The wetland optionally may include a PVC level adjuster 272 with level adjust piping 273, though a PVC level adjuster was not used in this example.

A recirculating sand filter 280 (see FIG. 2G) was constructed by excavating a rectangular basin in the native soil 100 cm deep, and lining with a 30 mil PVC liner. A network of 100 mm drainfield PVC piping was placed on the liner and covered with 12.5 cm of ¾ inch gravel, 18 cm of ⅜ inch pea gravel and 50 cm of coarse sand. On top of the sand a network of 2.5 cm PVC piping laid parallel, spaced 50 cm apart and drilled with 3 mm holes 50 cm apart was connected to a 50 mm header that was connected to a 1500 gallon concrete tank with a ½ hp Myers ME50 effluent pump. The pump provided a uniform dose of water. The pump operated on an intermittent basis with approximately ⅕ of the time on and ⅘ of the time off. Water pumped into the network of piping on top of the sand filter drained back into the concrete tank by a 75 mm PVC pipe connected to the under drains in the sand filter and the concrete tank.

Various levels of influent and effluent were measured and the results are shown in FIGS. 3-18. Samples were periodically taken of influent, reed bed effluent, and final effluent and delivered in prepared containers to an independent certified laboratory and tested according to standard methods well known to those skilled in the art.

Figure 3:
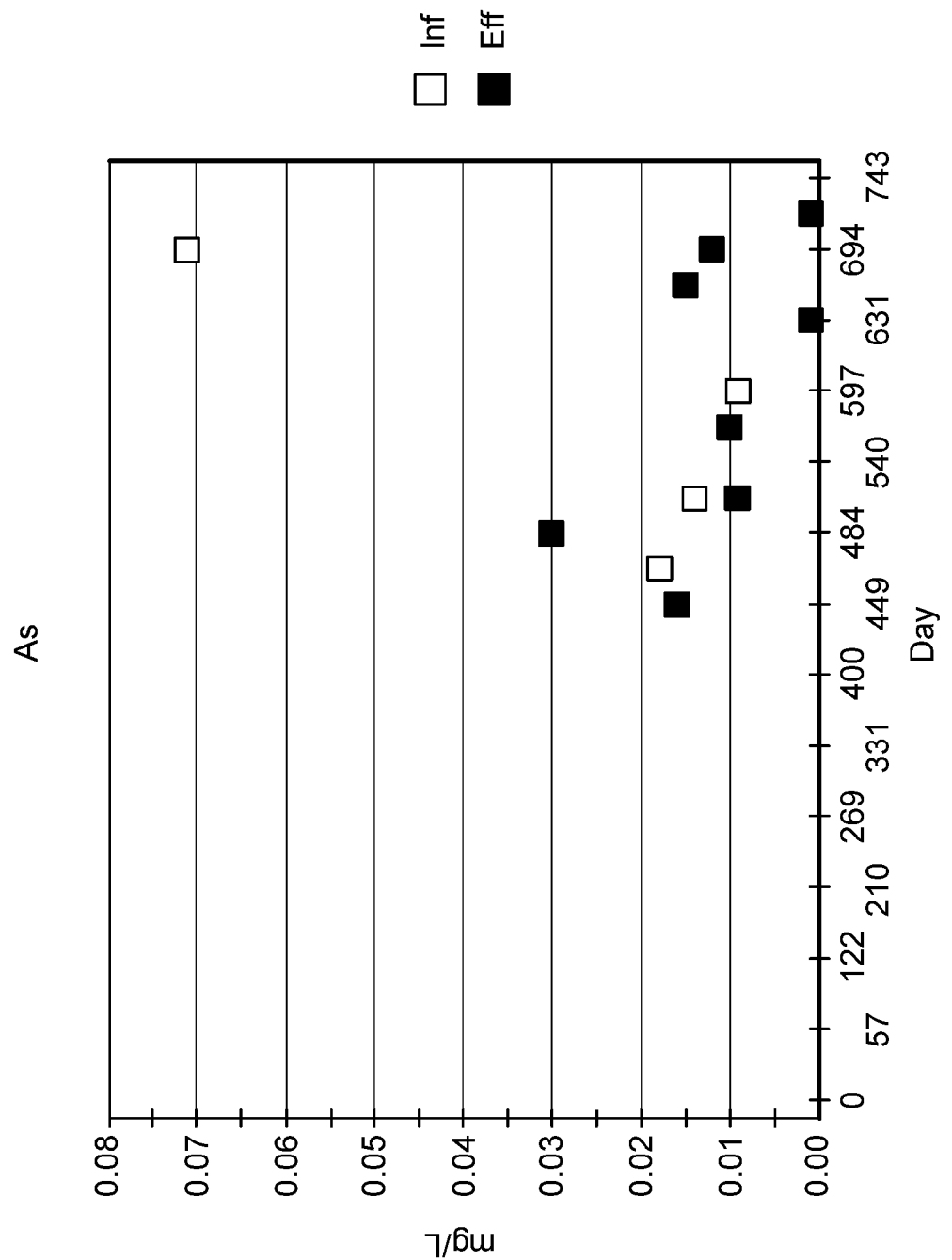
FIGS. 3-18 are results measured for influent and effluent for the illustrative waste treatment system described in Specific Example 1 below, in accordance with certain examples.

Referring now to FIG. 3, effluent arsenic levels are near non-detectable levels in measurements taken at about 630 days or thereafter.

Figure 4:
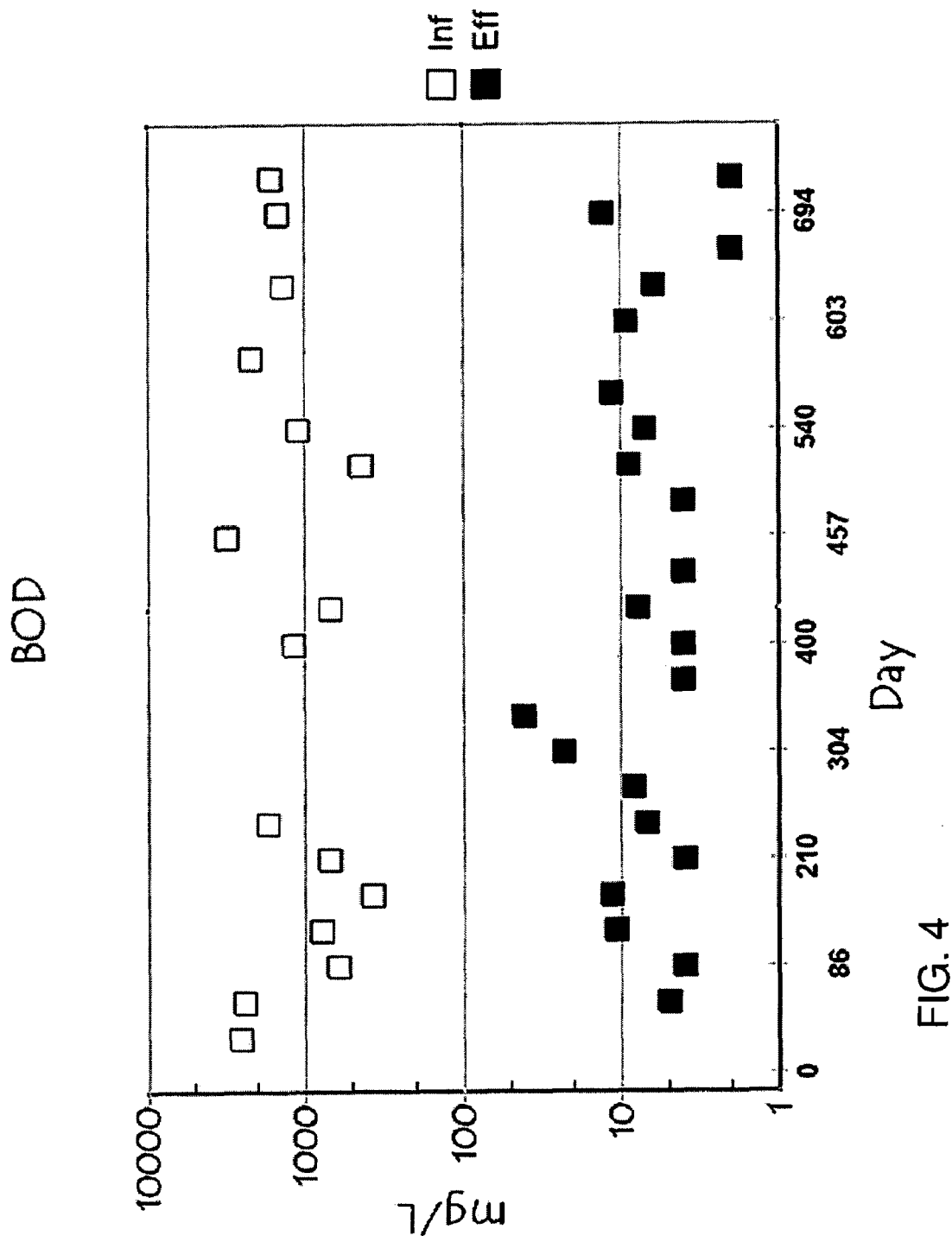

Referring now to FIG. 4, the biochemical oxygen demand (BOD) levels of effluent were measured to be about one hundred times lower than measured BOD levels in influent.

Figure 5:
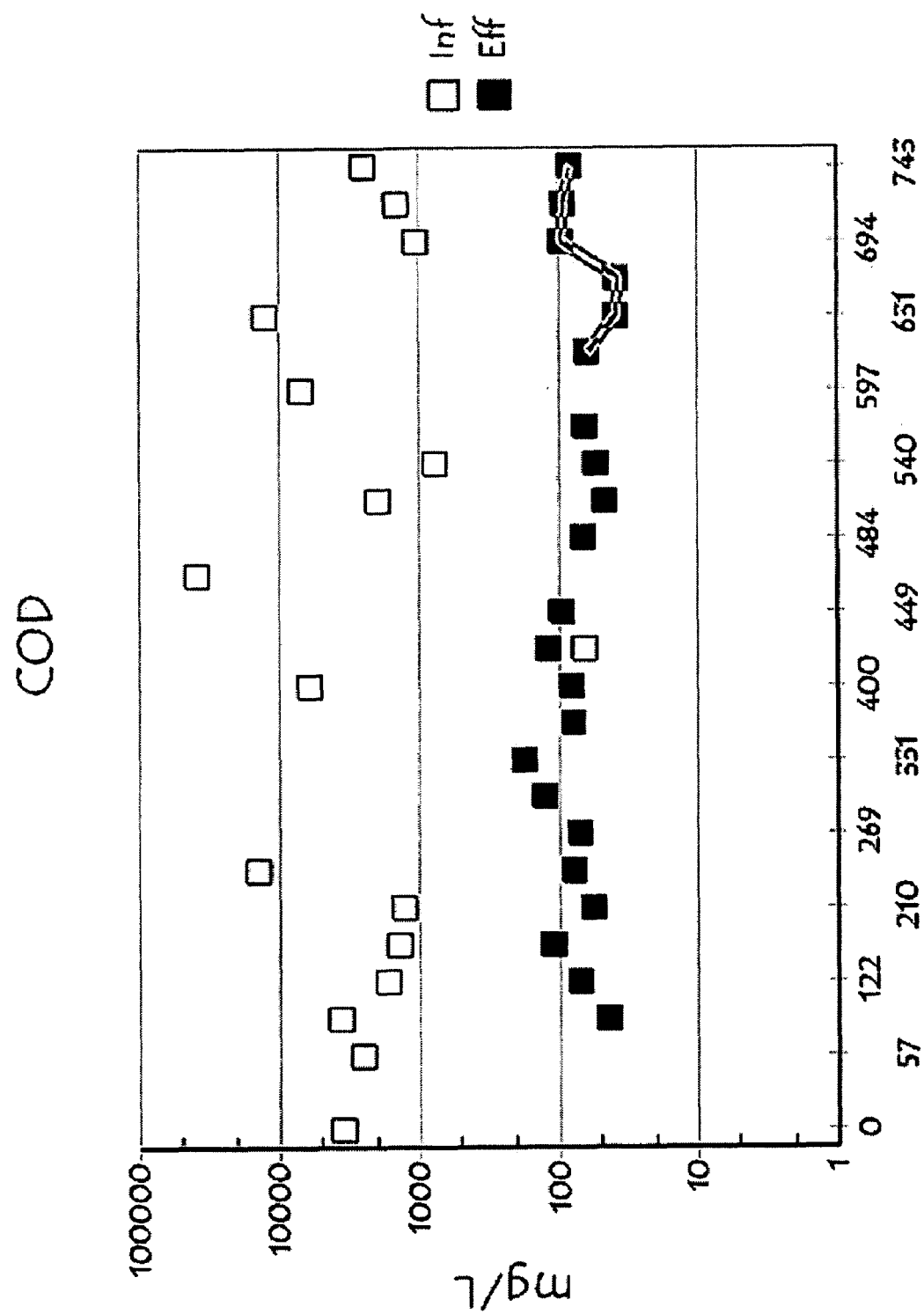

Referring now to FIG. 5, measured chemical oxygen demand (COD) levels in effluent were found to be at least about ten times lower than measured COD levels in influent.

Figure 6:
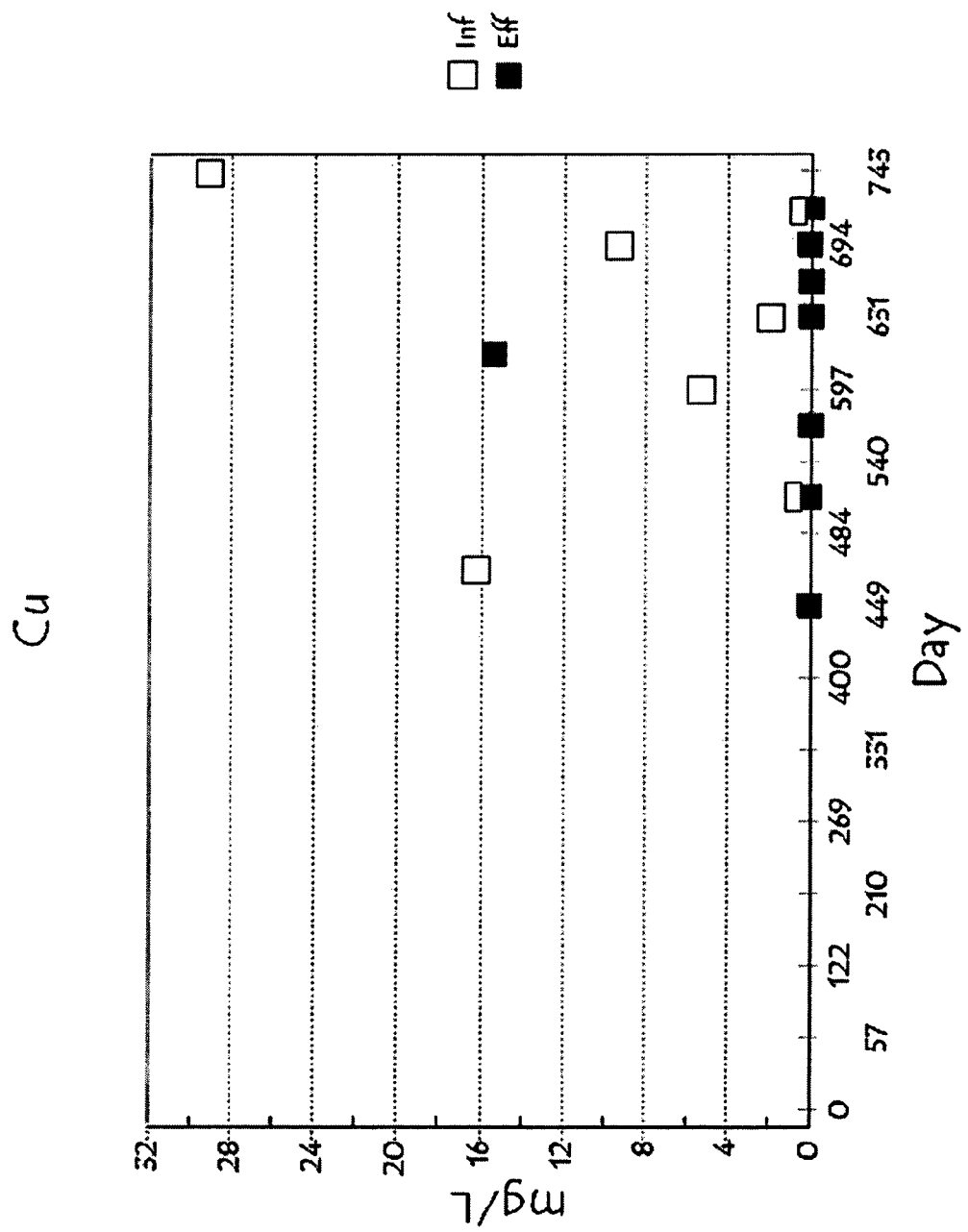

Referring now to FIG. 6, copper levels of effluent were generally not detectable in measurements taken at 450 days or thereafter.

Figure 7:
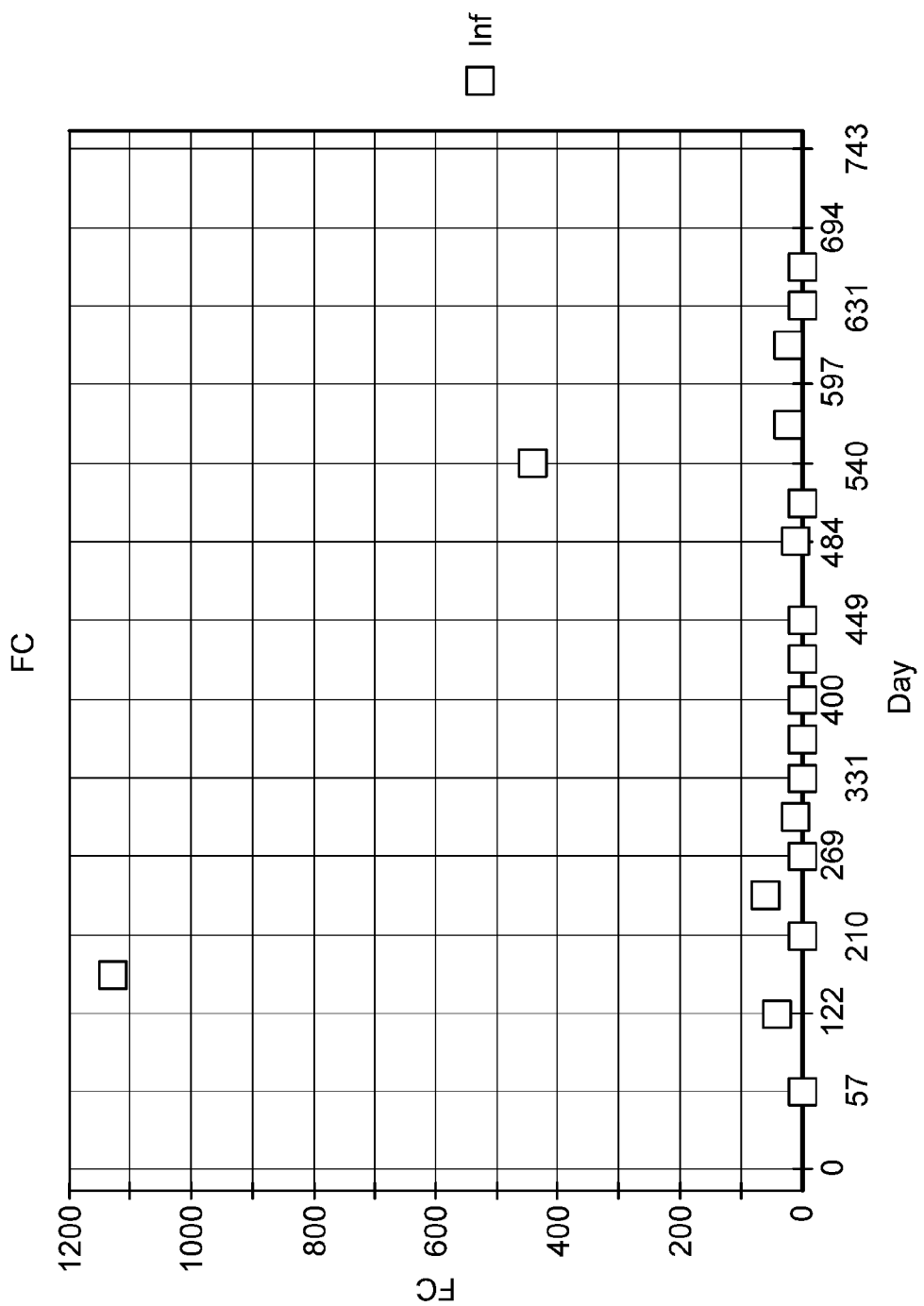

Referring now to FIG. 7, fecal coliform (FC) levels of influent were non-detectable in the majority of measurements.

Figure 8:
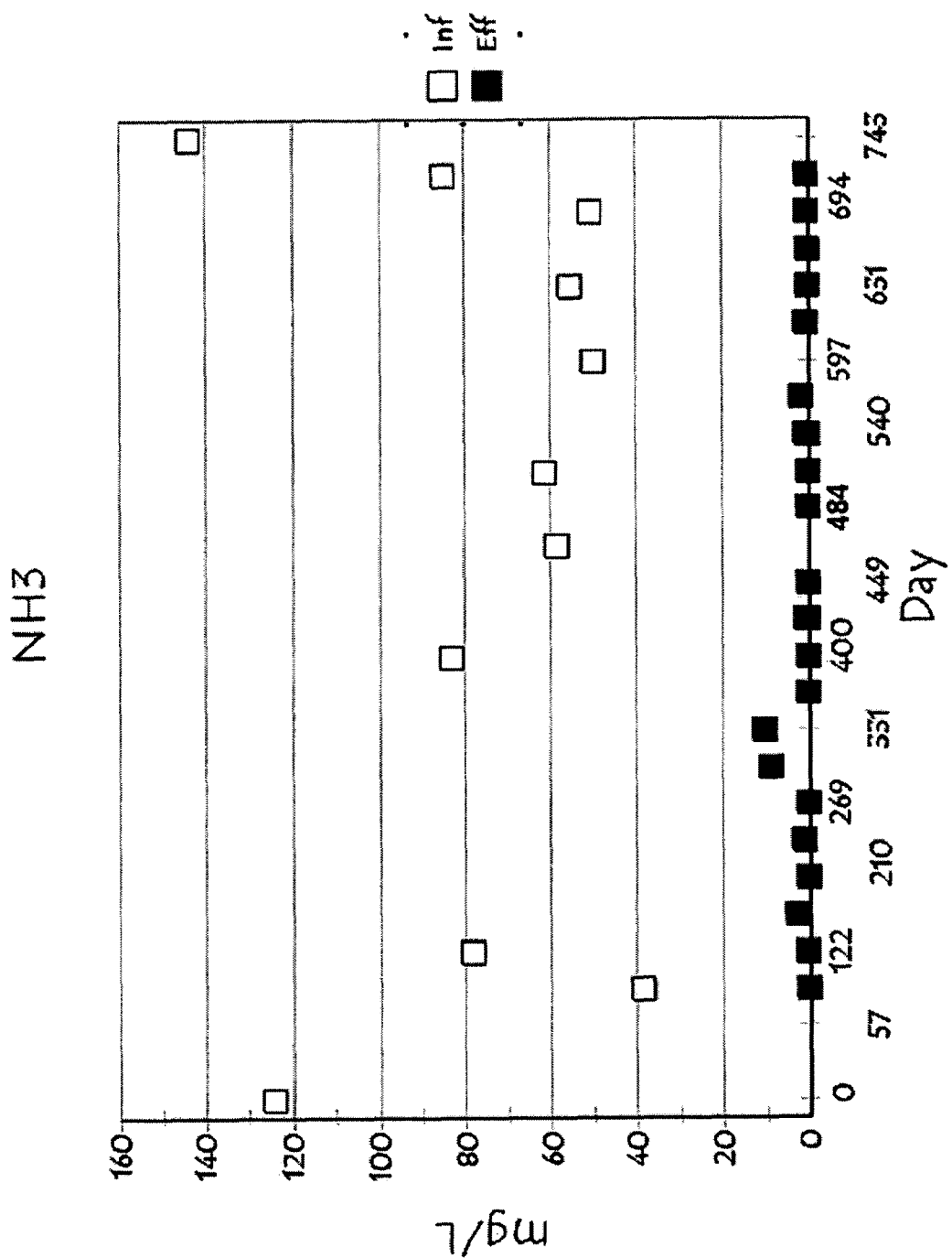

Referring now to FIG. 8, ammonia nitrogen levels of effluent averaged 1.0 mg/L and levels were non-detectable in 40% of the sample events.

Figure 9:
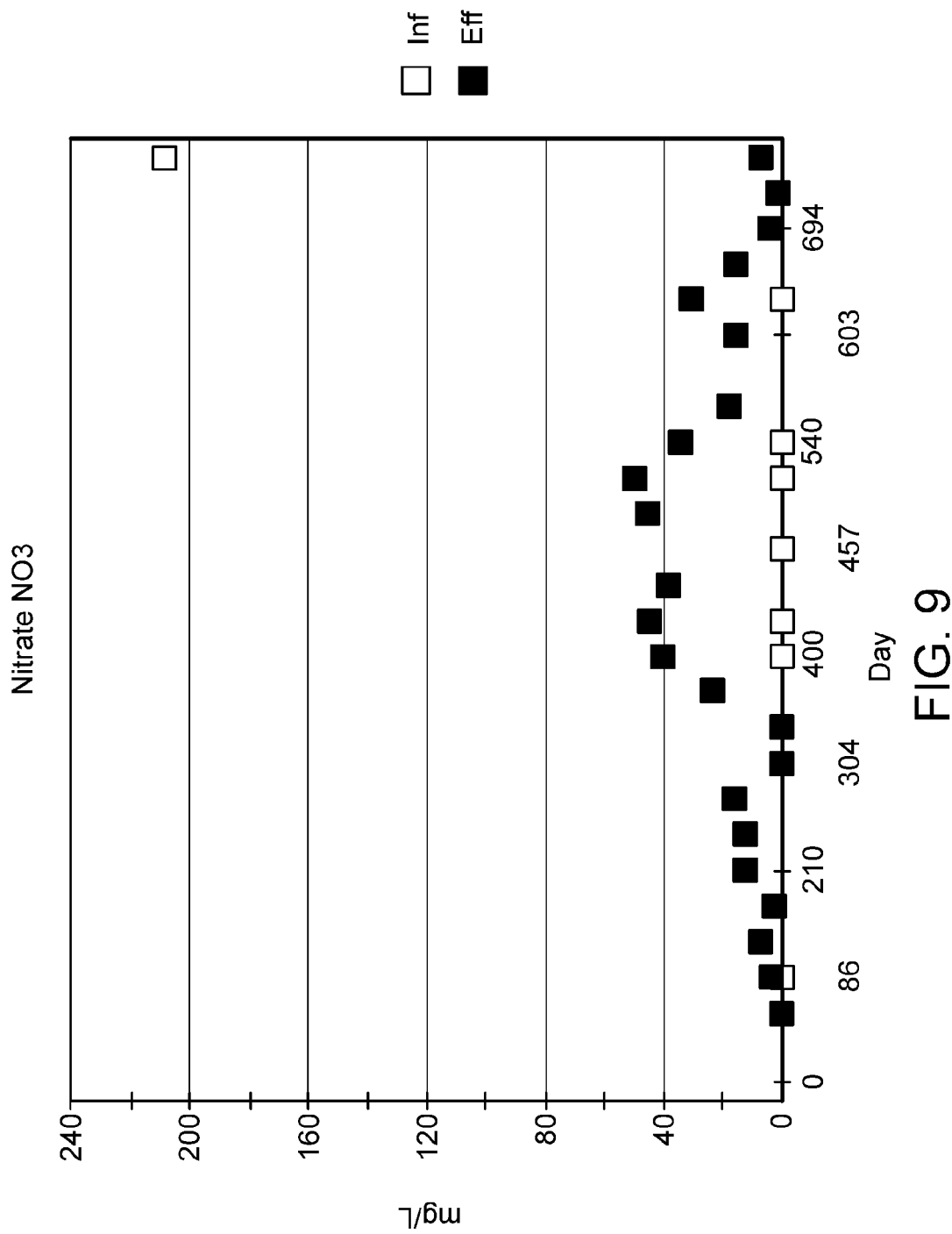

Referring now to FIG. 9, measured nitrate levels of effluent increased during the treatment process, which reflected conversion of ammonia and ammonium species into nitrates. However, effluent levels of nitrate nitrogen averaged less than about 10 mg/L.

Figure 10:
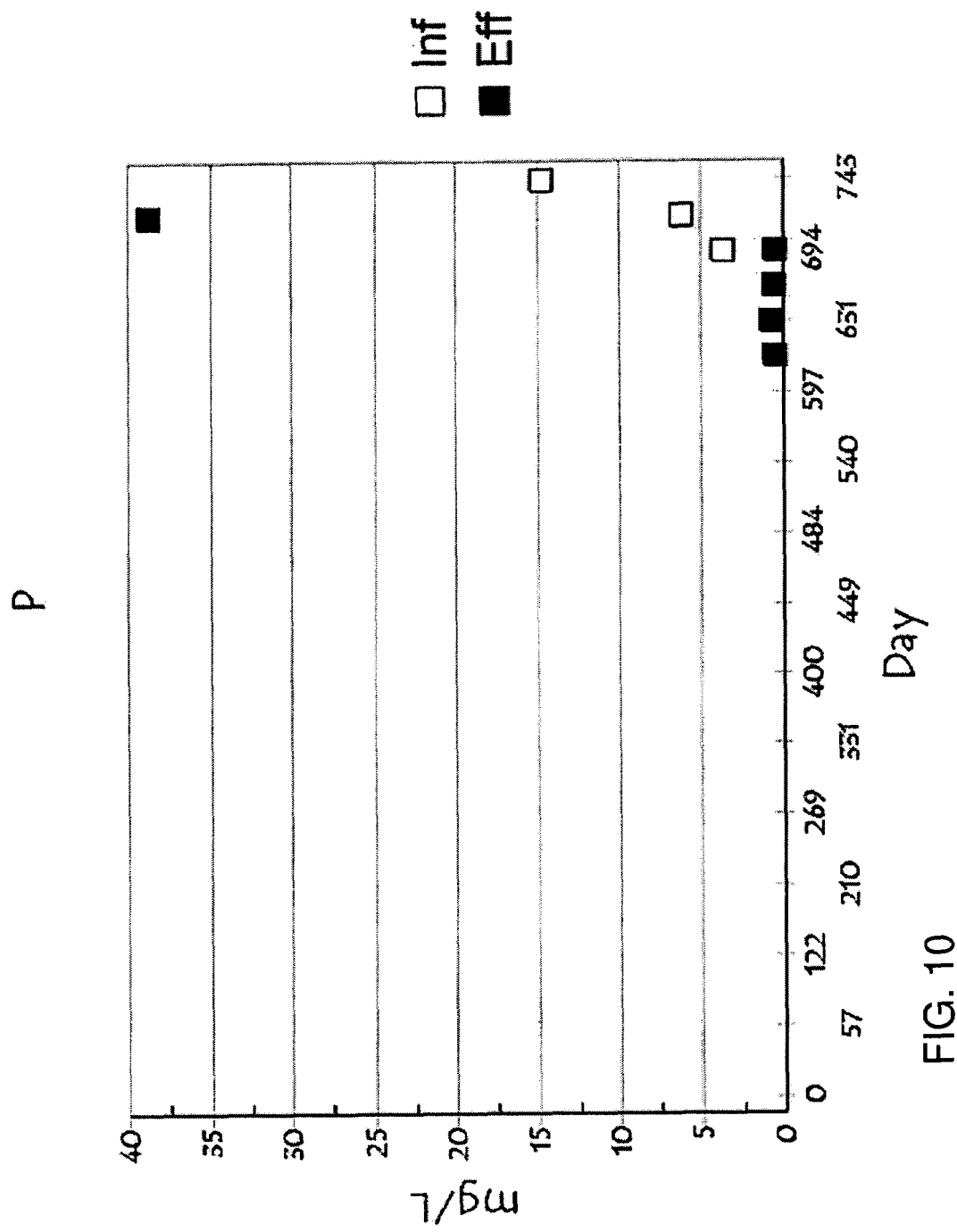

Referring now to FIG. 10, phosphorous levels measured in effluent were below detectable levels in the majority of the samples.

Figure 11:
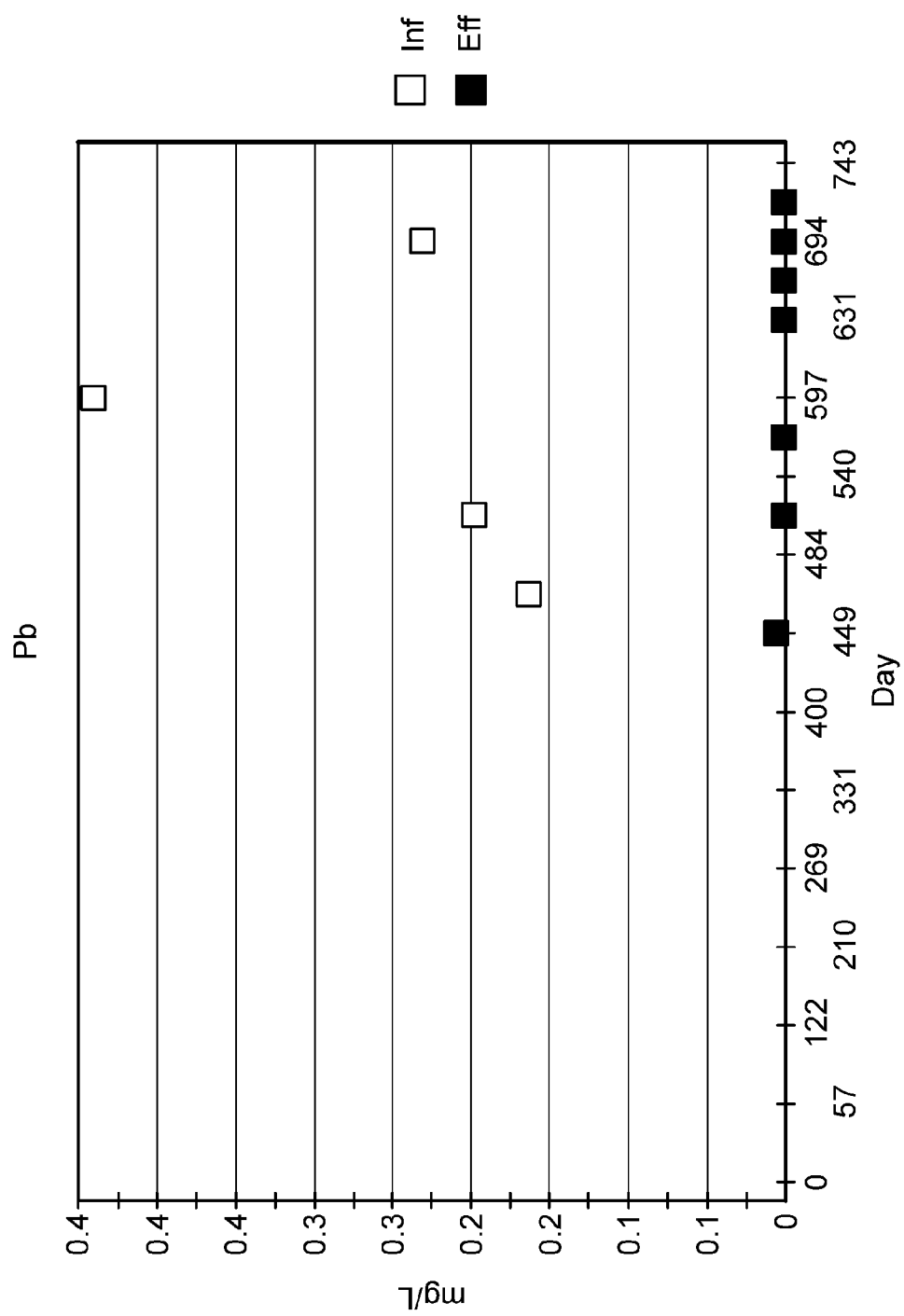

Referring now to FIG. 11, lead levels in effluent were non-detectable in every effluent sample.

Figure 12:
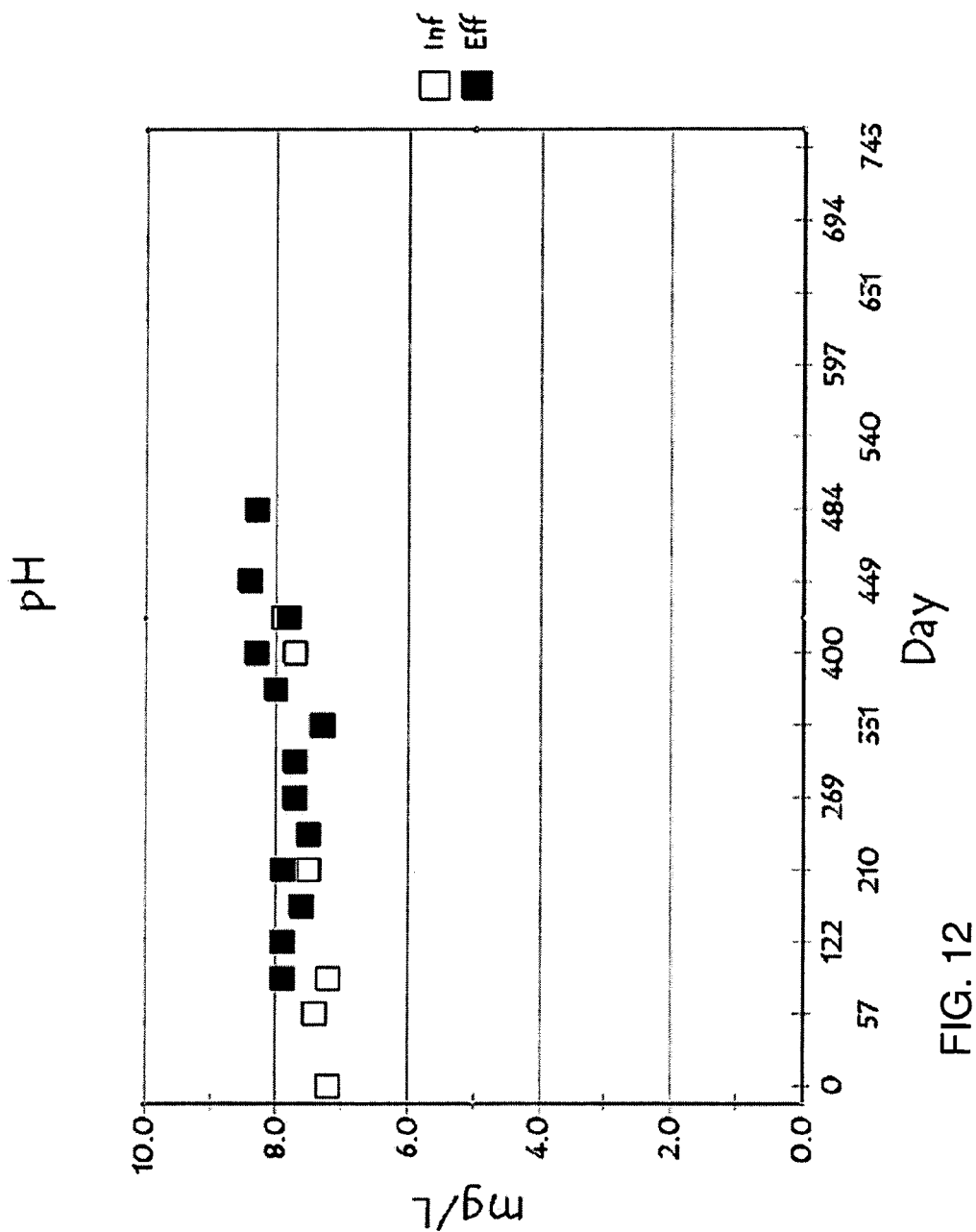

Referring now to FIG. 12, measured pH levels in influent and effluent were substantially the same and slightly alkaline.

Figure 13:
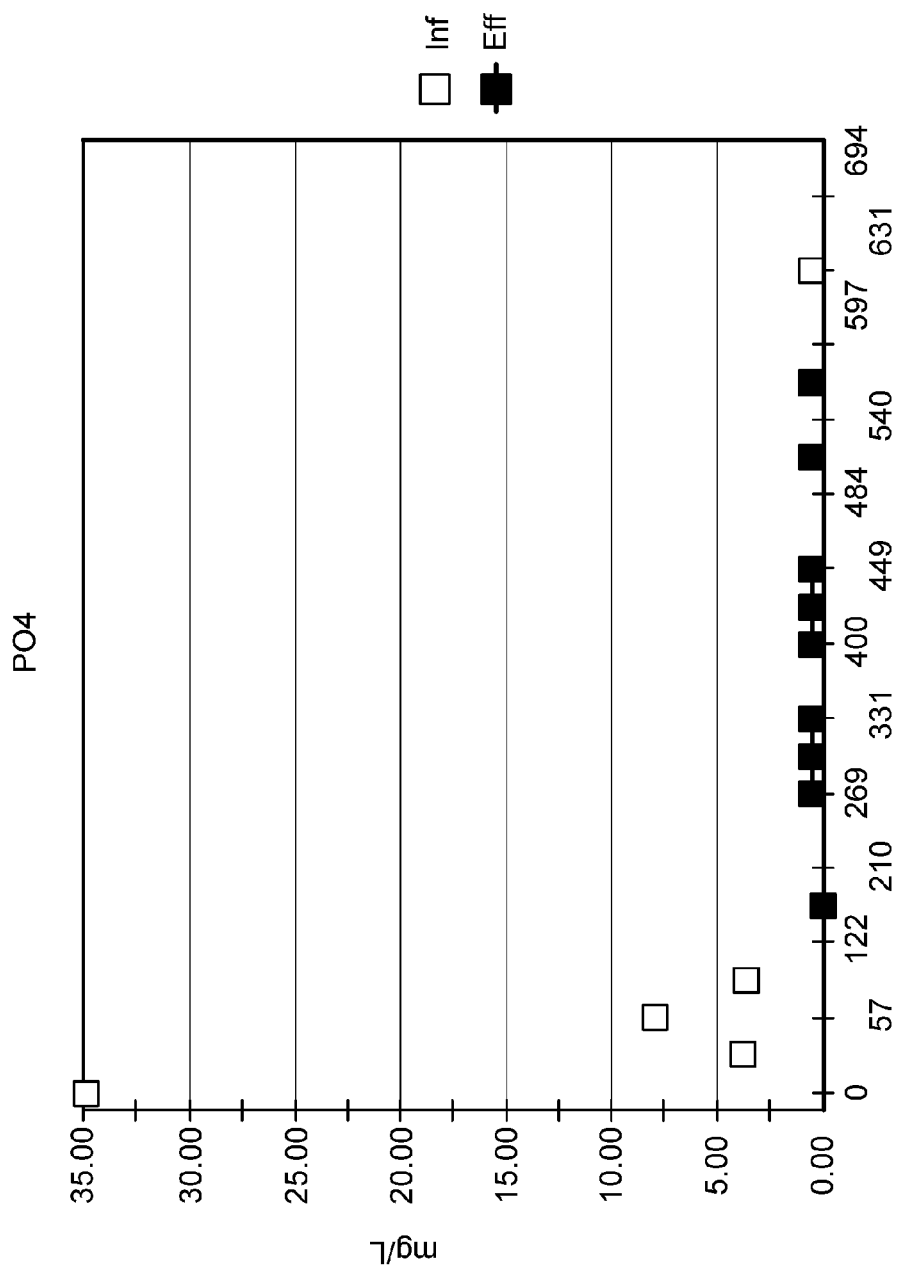

Referring now to FIG. 13, measured phosphate levels in influent averaged about eight times more than measured phosphate levels in effluent.

Figure 14:
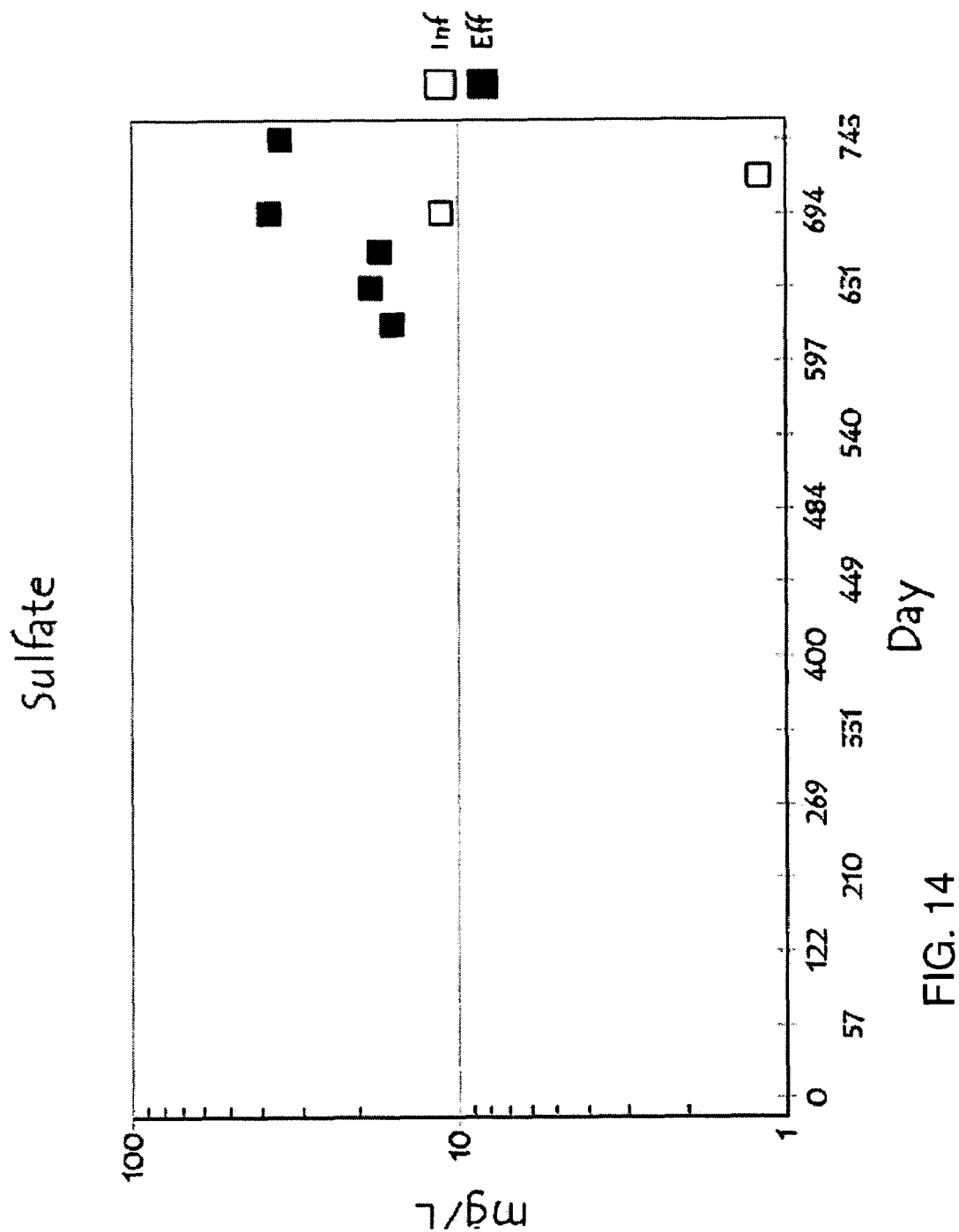

Referring now to FIG. 14, measured sulfate levels in effluent were substantially higher than measured sulfate levels in influent. This reflects the oxidation of sulfide to sulfate.

Figure 15:
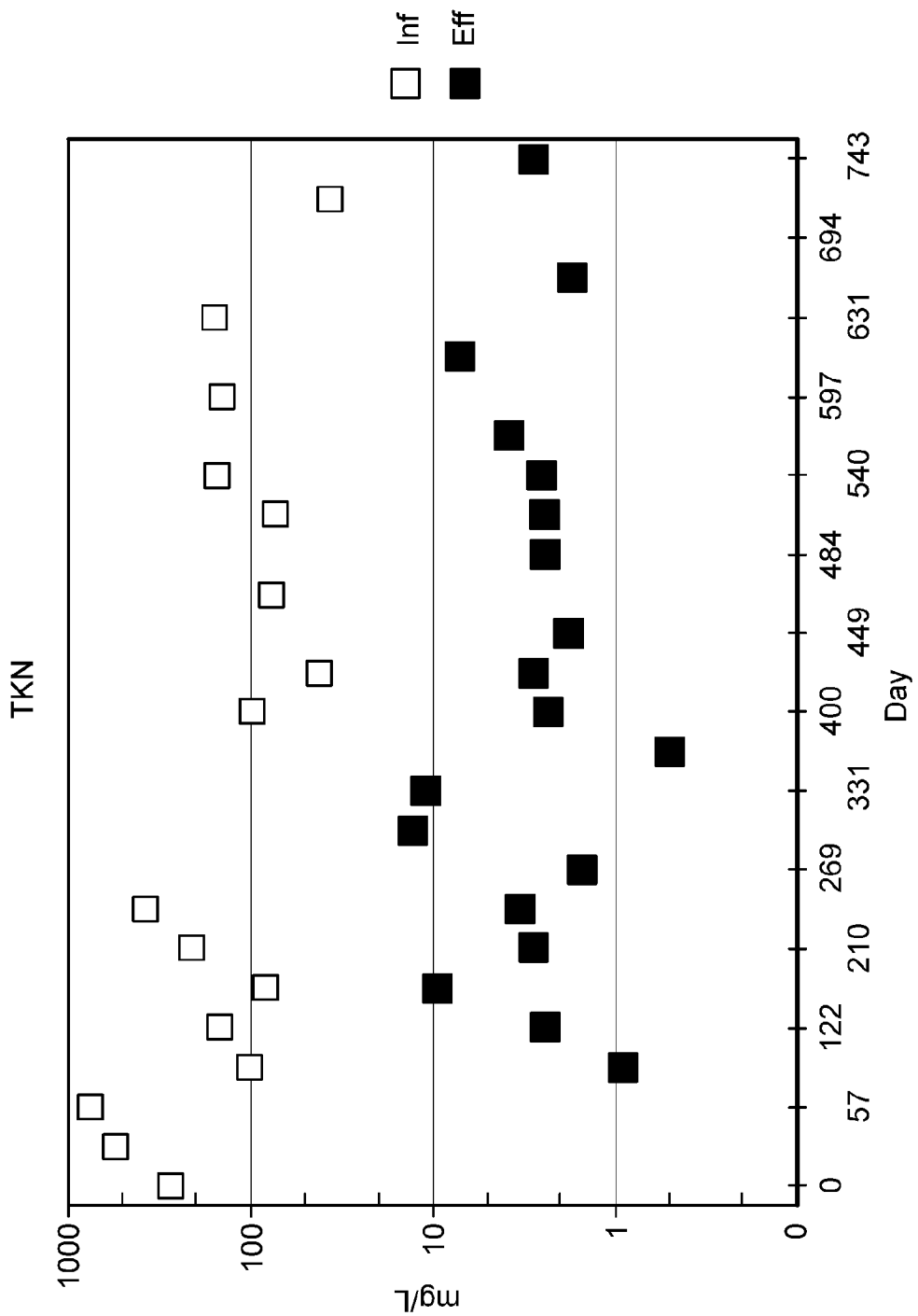

Referring now to FIG. 15, measured total Kjeldahl nitrogen (TKN) levels in effluent were found to be at least about ten times lower than the measured total Kjeldahl nitrogen levels in influent.

Figure 16:
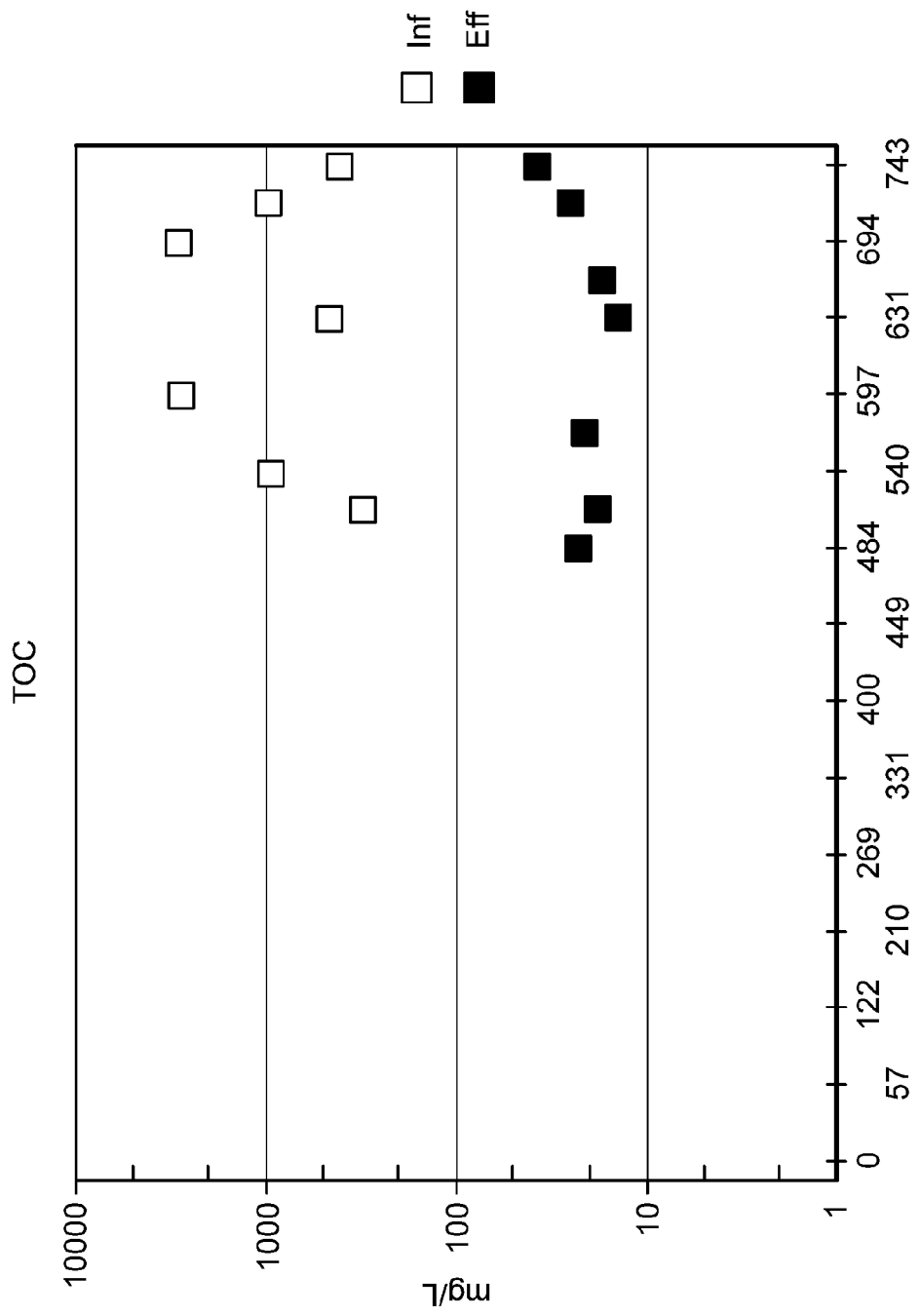

Referring now to FIG. 16, measured total organic carbon (TOC) levels in effluent were found to be at least about fifty times lower than measured total organic carbon levels in influent.

Figure 17:
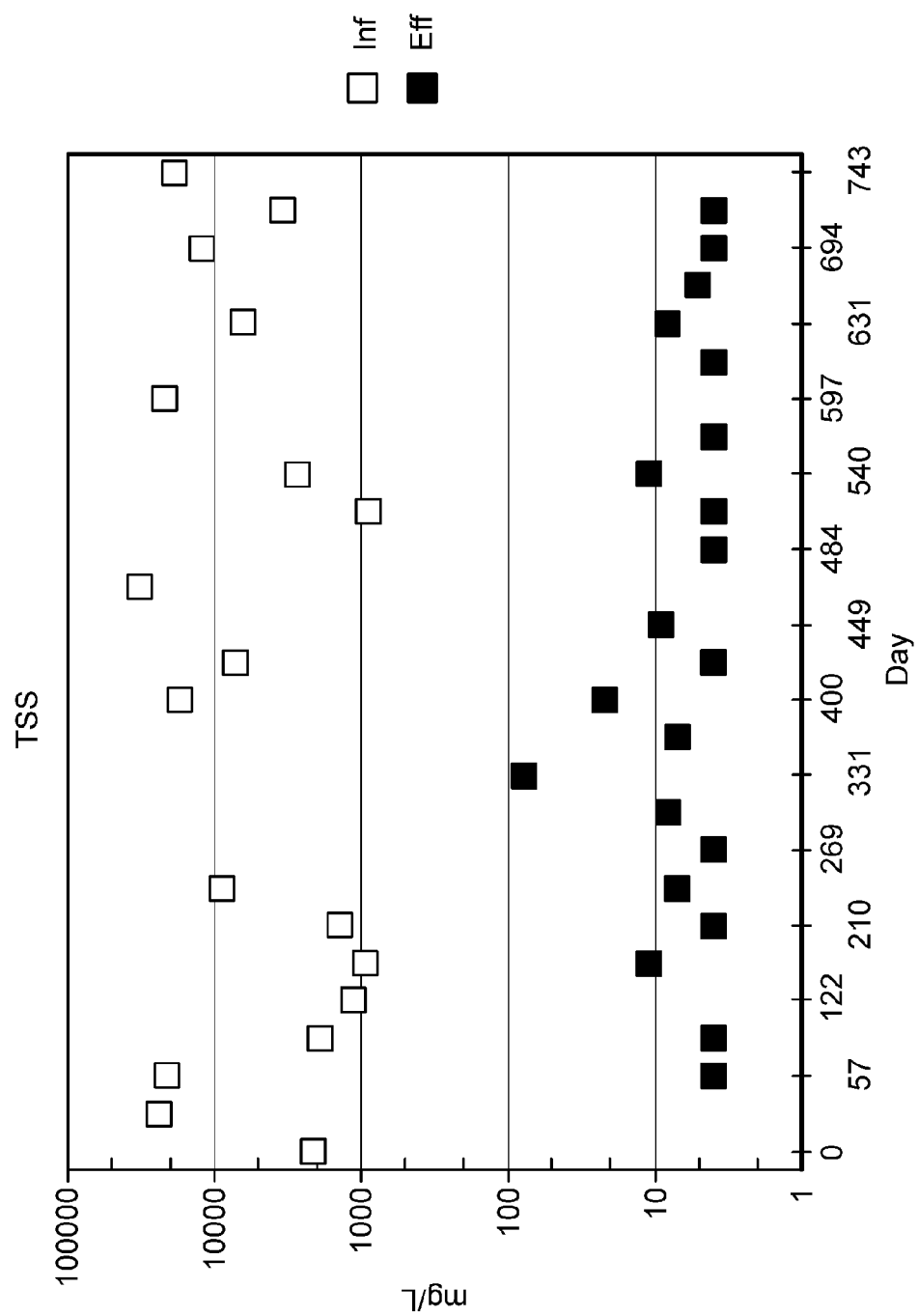

Referring now to FIG. 17, measured total suspended solid (TSS) levels in effluent were found to be at least about one hundred times lower than measured total suspended solid levels in influent.

Figure 18:
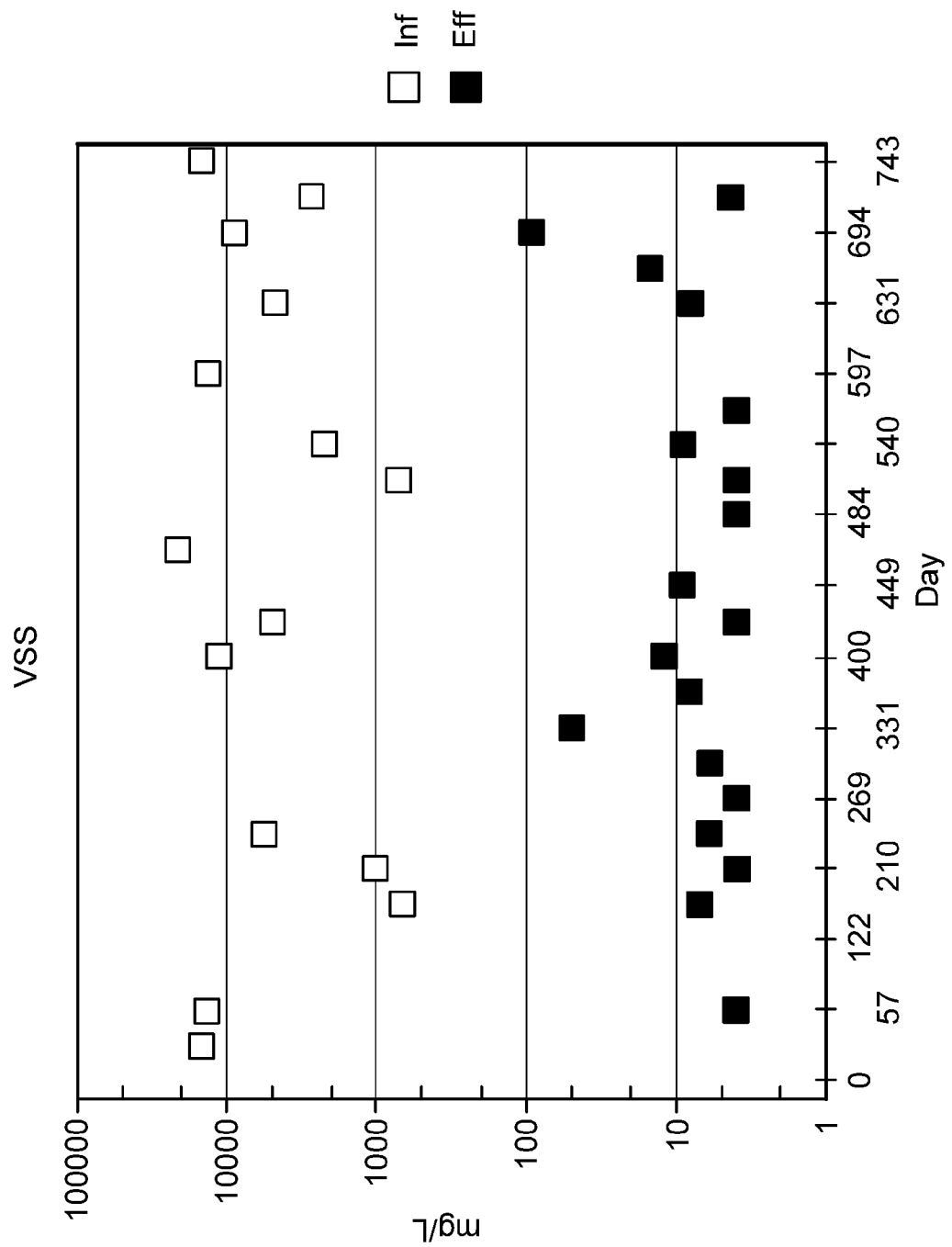
Figure 19:
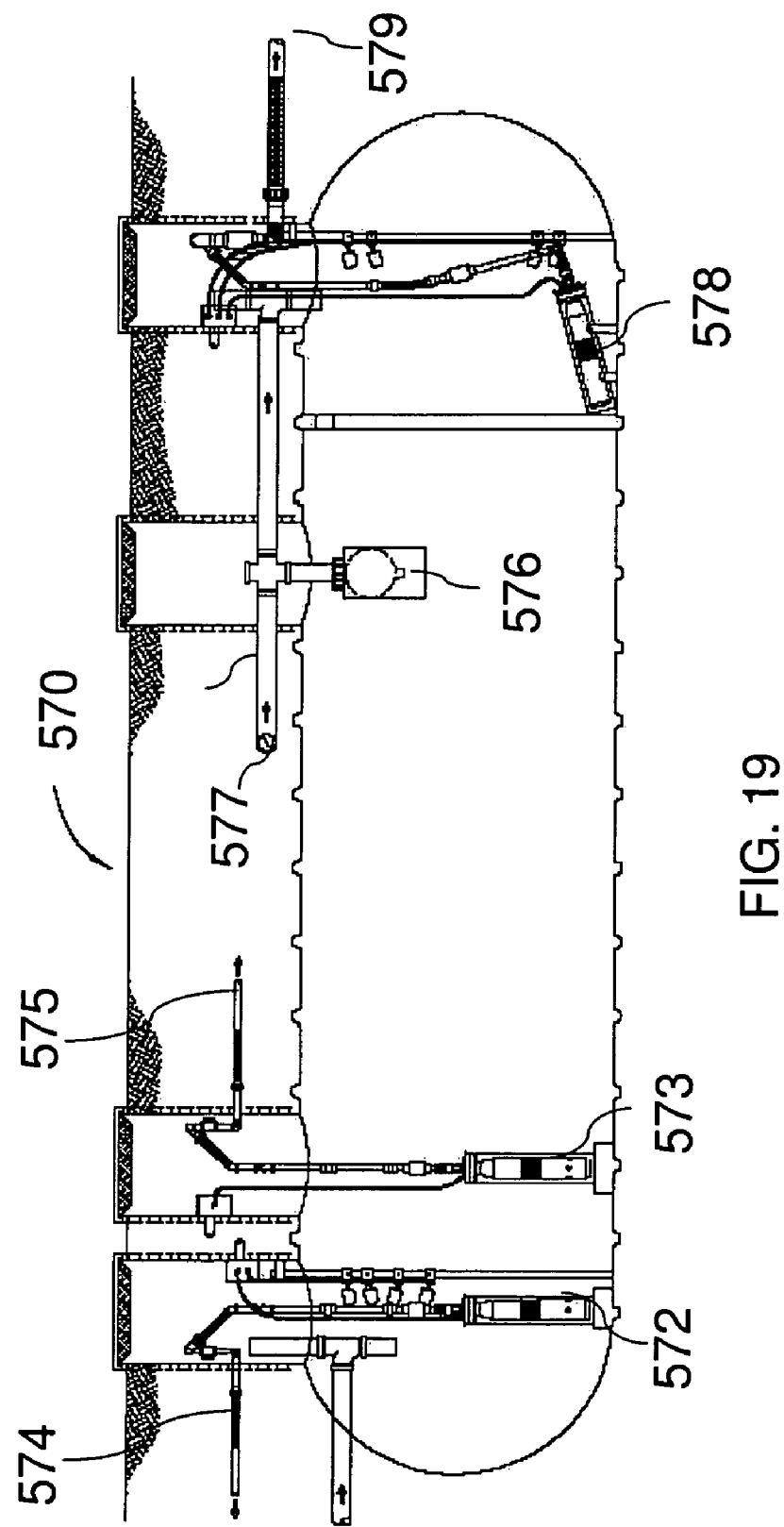
FIG. 19 is an example of a reflow/recirculation stage, in accordance with certain examples.

Referring now to FIG. 18, measured volatile suspended solid (VSS) levels in effluent were found to be at least about two hundred times lower than measured volatile suspended solid levels in influent.

SPECIFIC EXAMPLE 2

An exemplary waste treatment system includes a mechanical screening device in fluid communication with one or more holding tanks through a fluid conduit. Fluid holding tanks are in fluid communication with an equalization tank of about 200 cubic meters through a fluid conduit. Equalization tank has a network of 50 mm diameter PVC piping spaced 50 cm apart and in fluid communication with a blower/air compressor capable of providing about 0.9 cubic meters per minute per 100 cubic meters of septage and/or sludge received. The blower is controlled by a timing device and a low water float. Equalization tank is in fluid communication with four reed beds through four (4) 75 mm diameter PVC pipes that are supplied with four 1.0-2.0 hp effluent pumps. Septage delivery is controlled by a timing device which energizes each of the four pumps in series. Distribution of septage on the surface of the reed bed is provided by a network of 100 mm PVC pipe laid out in a 7 m×7 m grid with risers 1 meter tall connected to the grid every 7 meters.

Underdrains in the reed bed are in fluid communication with a hyacinth lagoon of about 500 cubic meters volume, through fluid conduits 100 mm in diameter PVC piping. Hyacinth lagoon is supplied with a network of fine bubble diffusers each capable of providing 300 L/min that are placed in the first ⅓ of the hyacinth lagoon. Aeration network is in fluid communication with a blower/compressor that supplies about 50 L/min and is controlled via timing device. A trickling filter of about 6.9 cubic meters is in fluid communication through 50 mm PVC piping pump via a ¾ hp effluent pump placed in a screen vault. Fluid is returned to the front end of the hyacinth lagoon via 100 mm PVC piping.

The hyacinth lagoon is in fluid communication via 100 mm PVC and a level adjusting mechanism (rotating PVC elbow located in a sump) flows through to the constructed wetlands. The constructed wetlands is constructed in native soil and lined with a 30 mil PVC liner by excavating a shallow basin whose depth is 0.6 cm and whose total volume is about 250 cubic meters. The constructed wetlands, divided into 40 equal cells are fed by a distribution box which equalizes flow using 4 "V" notch weirs, and half chamber infiltration systems that are placed at the front end of the wetlands at right angles to the direction of flow. At the effluent end of the wetlands 100 mm perforated PVC drainage pipe is connected to a level adjusting mechanism consisting of 100 mm PVC elbow fittings that may be rotated up to about 90 degrees from the horizontal. The wetlands are filled with 60 cm of 12.5 to 25 mm washed gravel, topped with 12.5 cm of washed 9 mm pea gravel and planted with *Typha latifolia, Typha domingensis, Scirpus validus, Scirpus fluvialitis*, and *Phragmites communis*.

Effluent from the constructed wetlands is in fluid communication with a 11.25 cubic meter reuse/recycle/recirculation fiberglass tank 570 (see FIG. 19). ¾ horsepower pumps 572 and 573, controlled by a timing device, pumps water from one compartment of the tank to a recirculating sand filter (RSF) 700 having an area of about 245 square meters and a depth of about 1 meter through fluid conduits 574 and 575.

The recirculating sand filter (RSF) is constructed by excavating a basin to a depth of about 1.0 meter, and lining with a 30 mil PVC liner. A network of 100 mm perforated drainpipes is placed on the liner at 7.0 meters centers and covered with 21 mm gravel to a depth of 12.5 cm, which is in turn covered by 15 cm of 9 mm pea gravel. Finally a layer of coarse sand is placed on top of the gravel to a depth of 30 cm. On this coarse sand a network of 50 mm PVC piping is placed on 30 cm centers and drilled with 3 mm holes every 60 cm. The holes are covered with caps to prevent entry of sand but allow the free flow of water. The entire network is covered by 9 mm pea gravel to a depth of 12.5 cm. The RSF is in fluid communication with the recirculation tank via underdrains which collect the filtrate from the RSF and deliver it through a 100 mm PVC pipe 577 to recirculation ball valve 576 in the recirculation tank. Some portion of the filtrate is recycled while the remainder flows via a 100 mm PVC pipe to the discharge and recycle portion of the tank where a ¾ hp pump 578 recycles some portion of the treated effluent or discharges the balance to an irrigation system through fluid conduit 579.

SPECIFIC EXAMPLE 3

Figure 20:
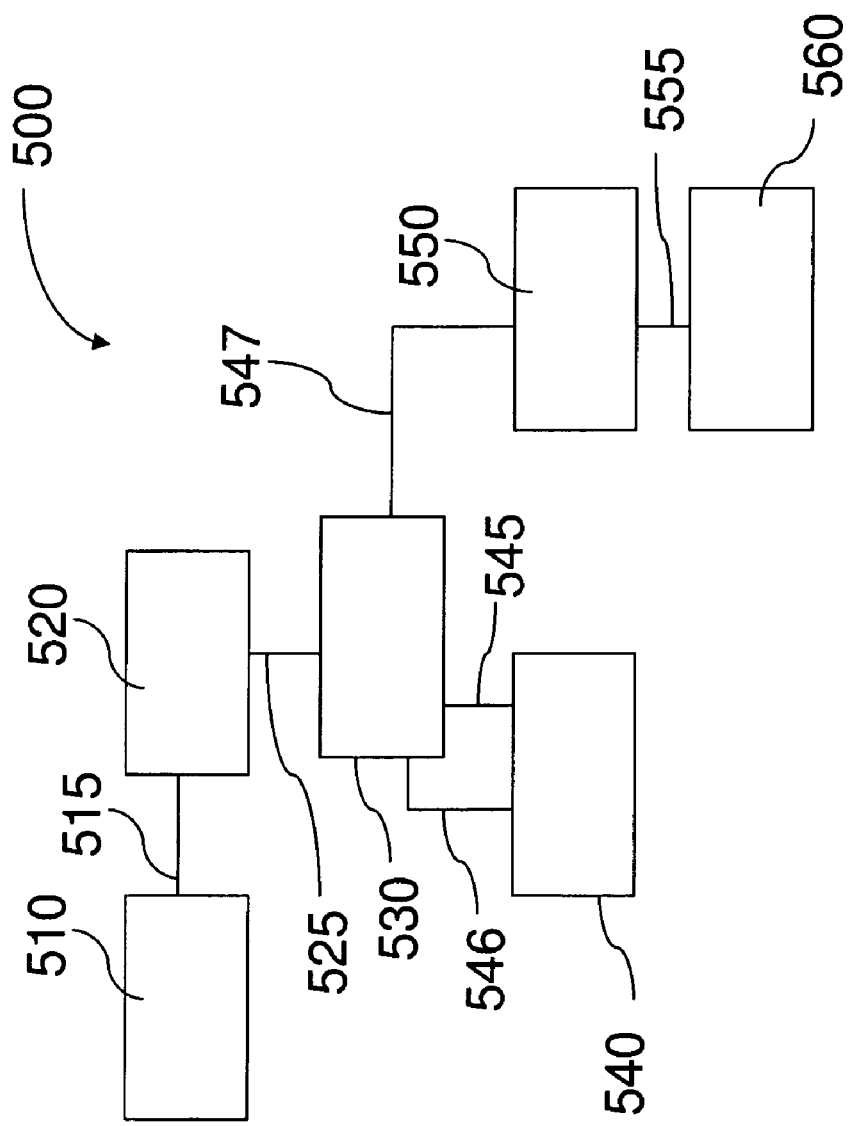
FIG. 20 is a block diagram of an exemplary waste treatment system, in accordance with certain examples.

A block diagram of a waste treatment system for treating domestic sludge and/or septage is shown in FIG. 20. Waste treatment system 500 includes centrifuge 510 in fluid communication with equalization vessel 520 through fluid conduit 515. Centrifuge 510 is operative to remove inorganic and organic solids from the septage prior to passing the septage to equalization vessel 520. Illustrative functions of the equalization vessel are discussed elsewhere herein, e.g., aeration and mixing. Equalization vessel 520 is in fluid communication with hyacinth lagoon 530. Hyacinth lagoon 530 is in fluid communication with trickling filter 540 through fluid conduits 545 and 546. As discussed elsewhere herein, the trickling filter is operative to nitrify the fluid. Hyacinth lagoon 530 is also in fluid communication with constructed wetlands 550 through fluid conduit 547. As discussed elsewhere herein, constructed wetland is adapted to provide denitrification and other functions. Constructed wetland 550 is in fluid communication with a recirculating sand filter 560 through fluid conduit 555. The functions of the recirculating sand filter are discussed in numerous instances above, e.g., removal of remaining suspended solids and CBOD. Illustrative organisms that may be found in the hyacinth lagoon, constructed wetland, or other stages discussed in this example, are listed in Tables 2-7 (see FIGS. 1B-1G).

SPECIFIC EXAMPLE 4

Figure 21:
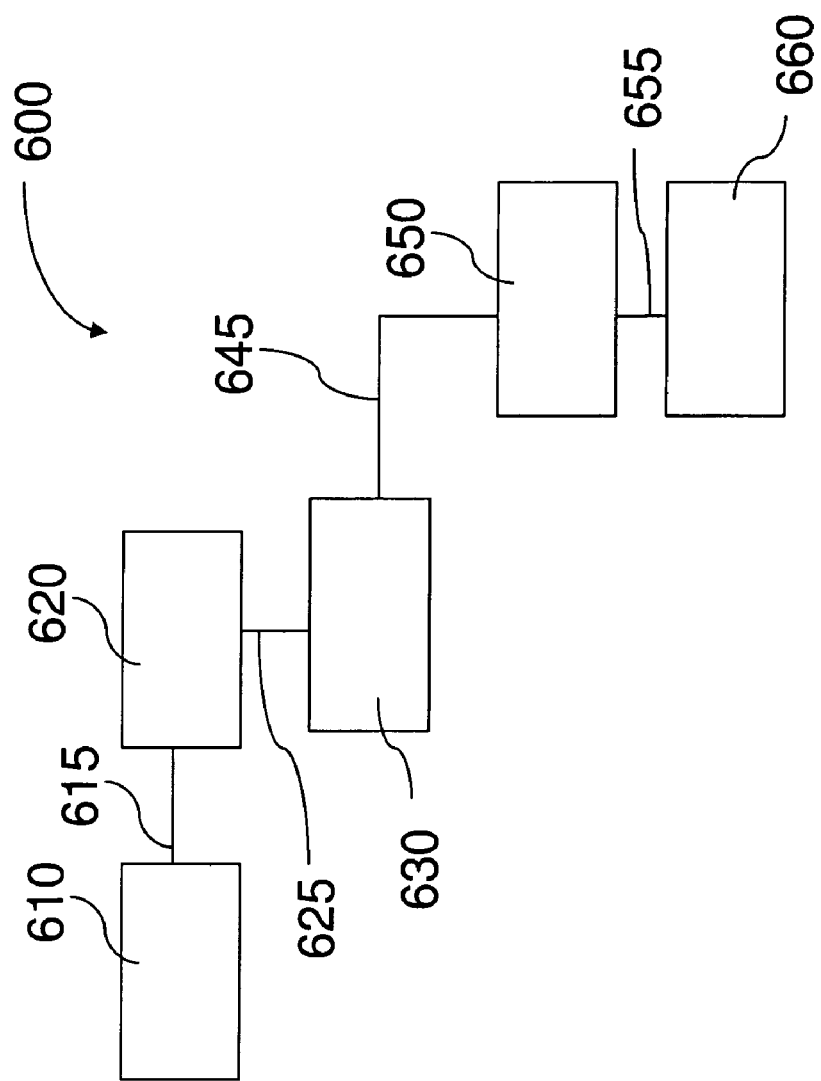
FIG. 21 is a block diagram of an exemplary waste treatment system, in accordance with certain examples.

A block diagram of a waste treatment system for treating domestic sludge and/or septage is shown in FIG. 21. Waste treatment system 600 includes filter press 610 in fluid communication with equalization vessel 620 through fluid conduit 615. Filter press 610 is operative to screen and remove trash and to remove inorganic and organic solids from the septage prior to passing the septage to equalization vessel 620. Illustrative functions of the equalization vessel are discussed elsewhere herein, e.g., aeration and mixing. Equalization vessel 620 is in fluid communication with activated sludge system 630 through fluid conduit 625. Activated sludge system 630 is configured to reduce CBOD, suspended solids and nitrogen using high rate aeration, recirculation of suspended solids and mixing. Activated sludge system 630 may optionally include filters, such as, for example, nitrification filters. Activated sludge system 630 is in fluid communication with constructed wetlands 650 through fluid conduit 645. As discussed elsewhere herein, constructed wetland is adapted to provide denitrification. Constructed wetland is in fluid communication with a recirculating sand filter 660 through fluid conduit 655. The functions of the recirculating sand filter are discussed in numerous instances above, e.g., removal of remaining suspended solids and CBOD. Illustrative organisms that may be found in the constructed wetland, or other stages discussed in this example, are listed in Tables 2-7 (see FIGS. 1B-1G).

SPECIFIC EXAMPLE 5

Figure 22:
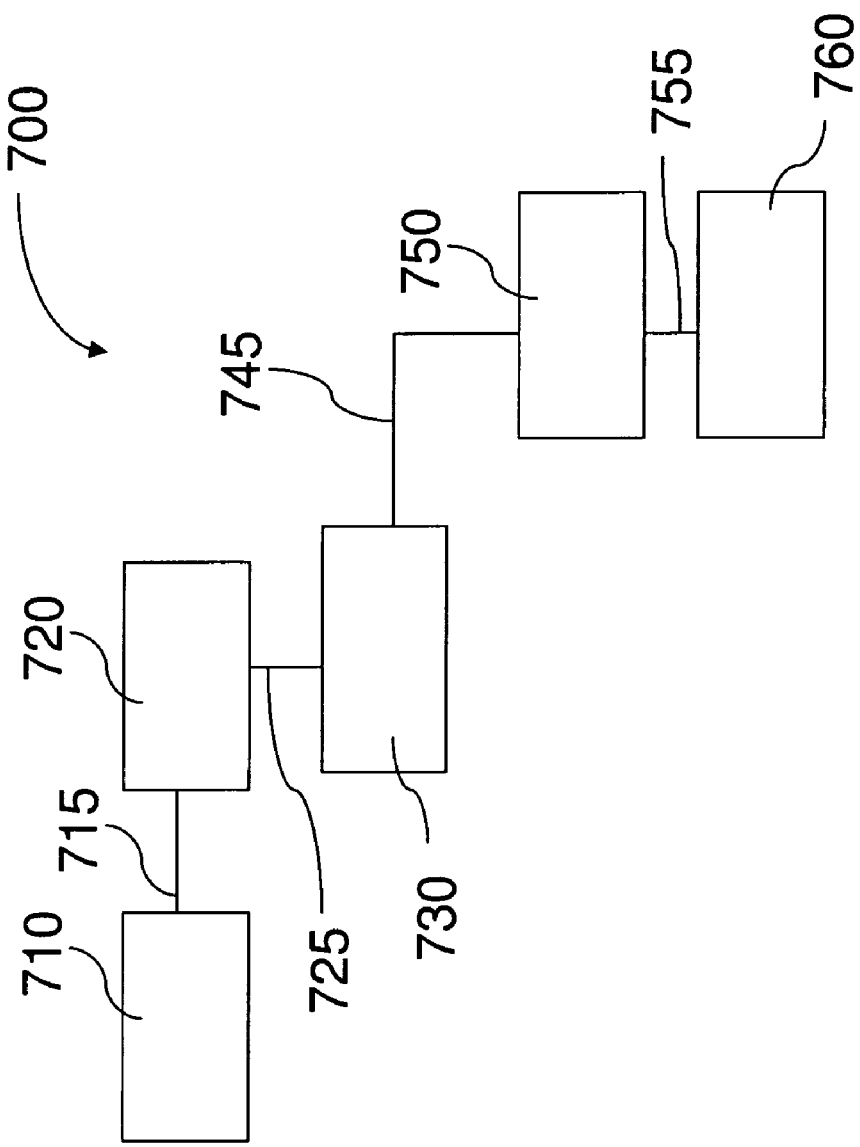
FIG. 22 is a block diagram of an exemplary waste treatment system, in accordance with certain examples.

A block diagram of a waste treatment system for treating domestic sludge and/or septage is shown in FIG. 22. Waste treatment system 700 includes filter press 710 in fluid communication with equalization vessel 720 through fluid conduit 715. Filter press 710 is operative to screen and remove trash and to remove inorganic and organic solids from the septage prior to passing the septage to equalization vessel 720. Illustrative functions of the equalization vessel are discussed elsewhere herein, e.g., aeration and mixing. Equalization vessel 720 is in fluid communication with sequencing batch reactor (SBR) 730 through fluid conduit 725. SBR 730 is operative to reduce CBOD, suspended solids and nitrogen using high rate aeration and pumping systems. SBR 730 may optionally use, or be replaced with, extended aeration systems, oxidations ditches and the like. SBR 730 is in fluid communication with constructed wetlands 750 through fluid conduit 745. As discussed elsewhere herein, constructed wetland is adapted to provide denitrification. Constructed wetland is in fluid communication with a recirculating sand filter 760 through fluid conduit 755. The functions of the recirculating sand filter are discussed in numerous instances above, e.g., removal of remaining suspended solids and CBOD. Illustrative organisms that may be found in the constructed wetland, or other stages discussed in this example, are listed in Tables 2-7 (see FIGS. 1B-1G).

When introducing elements of the examples disclosed herein, the articles "a", "an", "the" and "said" are intended to mean that there are one or more of the elements. The terms "comprising", "including" and "having" are intended to be open ended and mean that there may be additional elements other than the listed elements. It will be recognized by the person of ordinary skill in the art, given the benefit of this disclosure, that various components of the examples can be interchanged or substituted with various components in other examples. Should the meaning of the terms of any of the patents, patent applications or publications incorporated herein by reference conflict with the meaning of the terms used in this disclosure, the meaning of the terms in this disclosure are intended to be controlling.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A process of treating domestic sludge and/or septage, the process comprising:
    introducing domestic sludge and/or septage into a first stage adapted to separate and oxidize a soluble gas;
    aerating fluid in the first stage;
    passing effluent from the first stage to a second stage adapted to separate solids from liquid sludge and/or septage;
    passing effluent from the second stage to a third stage adapted to provide biological oxidation of water soluble carbon and nitrogen compounds;
    aerating fluid in the third stage;

passing effluent from the third stage to a fourth stage adapted to further oxidize carbon and nitrogen compounds;

passing effluent from the fourth stage to a fifth stage adapted to receive soluble oxidized nitrogen and carbon compounds and suspended solids from the fourth stage, and to remove the oxidized nitrogen and carbon compounds;

passing effluent from the fifth stage to a sixth stage adapted to remove remaining carbon and nitrogen compounds, suspended solids, and pathogenic organisms; and discharging treated wastewater from the sixth stage.

2. The process of claim 1, further comprising recycling effluent from the third stage to the first stage.

3. The process of claim 1, further comprising recycling effluent from the fourth stage to the first stage.

4. The process of claim 1, further comprising recycling effluent from the fifth stage to the first stage.

5. The process of claim 1, further comprising recycling effluent from the sixth stage to the first stage.

6. The process of claim 1, in which the first stage is aerated using about 4 to 8 cubic meters of air per 100 cubic meters of volume.

7. The process of claim 1, in which the third stage is aerated at a rate of about 30-60 liters of air per minute per 100 cubic meters of septage and/or sludge.

8. A process of treating domestic sludge and/or septage, the process comprising:

introducing domestic sludge and/or septage into a multi-stage waste treatment system comprising a first stage adapted to separate solids from the sludge and/or septage, and a second stage in fluid communication with the first stage and adapted to stabilize biosolids such that they meet Federal 503 part (a) regulations for the land application of biosolids; and passing effluent from the second stage to another stage adapted to provide biological oxidation of water soluble carbon and nitrogen compounds.

9. The process of claim 8, further comprising passing effluent from the another stage to an additional stage adapted to further oxidize carbon and nitrogen compounds.

10. The process of claim 9, further comprising passing effluent from the additional stage at least one other stage adapted to receive soluble oxidized nitrogen and carbon compounds and suspended solids from the additional stage, and to remove the oxidized nitrogen and carbon compounds.

11. The process of claim 10, further comprising passing effluent from the at least one other stage to a last stage adapted to remove remaining carbon and nitrogen compounds, suspended solids, and pathogenic organisms.

12. The process of claim 11, further comprising discharging treated wastewater from the final stage.

13. A process of treating domestic sludge and/or septage, the process comprising introducing domestic sludge and/or septage into a multi-stage waste treatment system configured to receive the domestic sludge and/or septage and configured to discharge treated wastewater, the multi-stage waste treatment system configured to separate and oxidize a soluble gas in a first stage, to stabilize biosolids such that they meet Federal 503 part (a) regulations for the land application of biosolids in a second stage in fluid communication with the first stage, to provide biological oxidation of water soluble carbon and nitrogen compounds in a third stage in fluid communication with the second stage, to remove oxidized nitrogen and carbon compounds in a fourth stage in fluid communication with the third stage, and to remove suspended solids and pathogenic organisms prior to discharge of the treated wastewater in a fifth stage in fluid communication with the fourth stage.

14. The process of claim 13, in which the multi-stage waste treatment system comprises a first ecosystem based on the microbial ecology of a eutrophic lake or pond bottom, the first ecosystem adapted to receive septage and/or sludge from which inorganic trash has been removed and configured to provide odor and temperature control to the septage and/or sludge.

15. The process of claim 14, in which the multi-stage waste treatment system comprises a second ecosystem in fluid communication with the first ecosystem, the second ecosystem based on the ecology of delta plants selected from one or more of *Phragmites communis, Phragmites australis, Arundo donax, Papyri aegypti, Scirpus acutus, Scirpus californicus*, or *Scirpus validus*, and any associated microbial and invertebrate communities, the second ecosystem adapted to reduce the volume of the sludge and septage by at least about 90%, to remove at least about 95% of the solids delivered from the first ecosystem and to mineralize nitrogen.

16. The process of claim 15, in which the multi-stage waste treatment system comprises a third ecosystem in fluid communication with the second ecosystem, the third ecosystem based on the ecology of subtropical and tropical ponds and including water hyacinths and associated floating and submergent pond plants, algae, attached growth microorganisms, macro and micro invertebrates, fish and amphibians, the third ecosystem adapted to nitrify and denitrify effluent received from the second ecosystem.

17. The process of claim 16, in which the multi-stage waste treatment system comprises a fourth ecosystem in fluid communication with the third ecosystem, the fourth ecosystem including emergent plants and microbial communities found in wetlands, the fourth ecosystem adapted to denitrify, remove phosphorus, remove pathogens and remove suspended solids in effluent received from the third ecosystem.

18. The process of claim 17, in which the multi-stage waste treatment system comprises a fifth ecosystem in fluid communication with the fourth ecosystem, the fifth ecosystem based on sands and gravel of a riparian corridor, the fifth ecosystem adapted to removal any suspended solids and oxidize any remaining soluble carbon compounds in effluent received from the fourth ecosystem.

19. The process of claim 17, in which the multi-stage waste treatment system is configured to treat 100 cubic meters of domestic sludge and/or septage introduced into the waste treatment system using less than 75 kilowatts.

\* \* \* \* \*